(12) United States Patent
Kaseda et al.

(10) Patent No.: US 9,537,148 B2
(45) Date of Patent: *Jan. 3, 2017

(54) POSITIVE ELECTRODE ACTIVE SUBSTANCE, POSITIVE ELECTRODE MATERIAL, POSITIVE ELECTRODE, AND NON-AQUEOUS ELECTROLYTE SECONDARY BATTERY

(71) Applicant: NISSAN MOTOR CO., LTD., Yokohama-shi, Kanagawa (JP)

(72) Inventors: Manabu Kaseda, Yokohama (JP); Shigeo Ibuka, Ebina (JP); Hiroaki Tanizaki, Yokohama (JP); Kodai Nagano, Yokohama (JP); Kenta Uwai, Yokohama (JP)

(73) Assignee: NISSAN MOTOR CO., LTD., Yokohama-Shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/771,106

(22) PCT Filed: Feb. 27, 2014

(86) PCT No.: PCT/JP2014/054830
§ 371 (c)(1),
(2) Date: Aug. 27, 2015

(87) PCT Pub. No.: WO2014/133064
PCT Pub. Date: Sep. 4, 2014

(65) Prior Publication Data
US 2016/0006031 A1    Jan. 7, 2016

(30) Foreign Application Priority Data
Feb. 28, 2013    (JP) .................................. 2013-040108

(51) Int. Cl.
*H01M 4/505* (2010.01)
*H01M 4/131* (2010.01)
(Continued)

(52) U.S. Cl.
CPC ............. *H01M 4/505* (2013.01); *H01M 4/131* (2013.01); *H01M 4/525* (2013.01);
(Continued)

(58) Field of Classification Search
CPC ...... H01M 4/131; H01M 4/505; H01M 4/525; H01M 2004/021
See application file for complete search history.

(56) References Cited

U.S. PATENT DOCUMENTS 7,670,722 B2    3/2010  Ryu et al.
8,592,085 B2   11/2013  Kobino et al.
(Continued)

FOREIGN PATENT DOCUMENTS

CN            101223658 A        7/2008
DE    WO 2011113515 A1 *  9/2011  ............ H01M 4/364
(Continued)

OTHER PUBLICATIONS

U.S. Appl. No. 14/771,017, filed Aug. 27, 2015, Nissan Motor Co., Ltd.
(Continued)

*Primary Examiner* — Stewart Fraser
(74) *Attorney, Agent, or Firm* — Foley & Lardner LLP

(57) ABSTRACT

Disclosed is a positive electrode active substance for a non-aqueous electrolyte secondary battery including a composite oxide containing lithium and nickel, in which the positive electrode active substance has a structure of secondary particles formed by aggregation of primary particles. The average particle diameter of the primary particles (D1) is 0.9 μm or less. The average particle diameter of the
(Continued)

primary particles (D1) and the standard deviation (σ) of the average particle diameter of the primary particles (D1) meet the relationship of $D1/\sigma^2 \geq 24$.

14 Claims, 3 Drawing Sheets

(51) Int. Cl.
 *H01M 4/525* (2010.01)
 *H01M 10/052* (2010.01)
 *H01M 10/0525* (2010.01)
 *H01M 4/02* (2006.01)

(52) U.S. Cl.
 CPC ...... *H01M 10/052* (2013.01); *H01M 10/0525* (2013.01); *H01M 2004/021* (2013.01); *H01M 2004/028* (2013.01); *Y02E 60/122* (2013.01)

(56) References Cited

U.S. PATENT DOCUMENTS

| | | | |
|---|---|---|---|
| 2001/0010807 A1 | 8/2001 | Matsubara | |
| 2005/0069758 A1 | 3/2005 | Kitao et al. | |
| 2005/0158546 A1 | 7/2005 | Shizuka | |
| 2006/0234115 A1 | 10/2006 | Watanabe et al. | |
| 2007/0048597 A1 | 3/2007 | Ryu et al. | |
| 2009/0239146 A1 | 9/2009 | Nakagawa et al. | |
| 2010/0117025 A1* | 5/2010 | Takeuchi | H01M 4/131 252/182.1 |
| 2011/0089368 A1 | 4/2011 | Tu | |
| 2012/0244413 A1* | 9/2012 | Shimano | C01G 1/02 429/144 |
| 2012/0308881 A1* | 12/2012 | Tokuda | H01M 10/0567 429/199 |
| 2013/0045421 A1 | 2/2013 | Kobino et al. | |
| 2013/0059211 A1* | 3/2013 | Schaefer | H01M 4/364 429/400 |
| 2013/0236780 A1* | 9/2013 | Yokote | H01M 4/485 429/211 |
| 2014/0050976 A1* | 2/2014 | Nagai | H01M 4/131 429/211 |
| 2014/0329147 A1* | 11/2014 | Mitsumoto | H01M 4/505 429/223 |
| 2016/0013471 A1* | 1/2016 | Kaseda | H01M 4/505 429/223 |
| 2016/0036041 A1* | 2/2016 | Uwai | H01M 4/131 429/223 |

FOREIGN PATENT DOCUMENTS

| | | |
|---|---|---|
| JP | 2001-085006 A | 3/2001 |
| JP | 2005-129492 A | 5/2005 |
| JP | 2006-294512 A | 10/2006 |
| JP | 2007-123255 A | 5/2007 |
| JP | 2007-213866 A | 8/2007 |
| JP | 2010-050079 A | 3/2010 |
| JP | 2011-086603 A | 4/2011 |
| JP | 2011-105588 A | 6/2011 |
| JP | 2011-105594 A | 6/2011 |
| KR | 10-2006-0009797 A | 2/2006 |
| KR | 10-2007-0021041 A | 2/2007 |
| KR | 10-2007-0049810 A | 5/2007 |
| WO | WO 1998/06670 A1 | 2/1998 |
| WO | WO 2007/021087 A1 | 2/2007 |
| WO | WO 2010/053058 A1 | 5/2010 |
| WO | WO 2012153379 A1 * | 11/2012 ............ H01M 4/131 |

OTHER PUBLICATIONS

U.S. Appl. No. 14/771,000, filed Aug. 27, 2015, Nissan Motor Co., Ltd.

U.S. Appl. No. 14/771,000, dated Sep. 27, 2016, 20 pages.

* cited by examiner

POSITIVE ELECTRODE ACTIVE SUBSTANCE, POSITIVE ELECTRODE MATERIAL, POSITIVE ELECTRODE, AND NON-AQUEOUS ELECTROLYTE SECONDARY BATTERY

TECHNICAL FIELD

The present invention relates to a positive electrode active substance, a positive electrode material, a positive electrode, and a non-aqueous electrolyte secondary battery.

BACKGROUND ART

Currently, a non-aqueous electrolyte secondary battery including a lithium ion secondary battery, which is used for a mobile device such as a mobile phone, is available as a commercial product. The non-aqueous electrolyte secondary battery generally has a constitution that a positive electrode having a positive electrode active substance or the like coated on a current collector and a negative electrode having a negative electrode active substance or the like coated on a current collector are connected to each other via an electrolyte layer in which a non-aqueous electrolyte solution or a non-electrolyte gel is maintained within a separator. According to absorption and desorption of ions such as lithium ions on an electrode active substance, charging and discharging reactions of a battery occur.

In recent years, it is desired to reduce the amount of carbon dioxide in order to cope with the global warming. As such, a non-aqueous electrolyte secondary battery having small environmental burden has been used not only for a mobile device but also for a power source device of an electric vehicle such as a hybrid vehicle (HEV), an electric vehicle (EV), or a fuel cell vehicle.

As the non-aqueous electrolyte secondary battery for application to an electric vehicle, it is required to have high output and high capacity. As a positive electrode active substance used for the positive electrode of a non-aqueous electrolyte secondary battery for an electric vehicle, a lithium cobalt composite oxide, which is a layered composite oxide, has been already widely used since it can provide high voltage at the level of 4 V and has high energy density. However, due to resource scarcity, cobalt as a raw material is expensive, and considering the possibility of having a dramatic demand in future, it is not stable in terms of supply of a raw material. There is also a possibility of having an increase in the raw material cost of cobalt. Accordingly, a composite oxide having less cobalt content ratio is desired.

Similarly to the lithium cobalt composite oxide, a lithium nickel composite oxide has a layered structure but is less expensive than the lithium cobalt composite oxide. Furthermore, it is almost equivalent to the lithium cobalt composite oxide in terms of theoretical discharge capacity. From this point of view, it is expected that a lithium nickel composite oxide is used for constituting a battery with high capacity for practical use.

With regard to a lithium ion secondary battery in which a composite oxide containing lithium and nickel such as a lithium nickel composite oxide (hereinbelow, also simply referred to as the "lithium nickel-based composite oxide") is used for a positive electrode active substance, charging and discharging are performed according to desorption and insertion of lithium ions from and to the composite oxide. At that time, since the composite oxide undergoes shrinkage and expansion in conjunction with the desorption and insertion of lithium ions, there are problems in that a great decrease in capacity occurs in accordance with repeated charge and discharge cycles by a factor such as the collapse of the crystal structure. There is also a problem in that a decrease in capacity becomes significant when the battery is used for a long period of time.

In view of the aforementioned problems, in JP 2001-85006 A, for example, a technique of forming secondary particles in a lithium nickel composite oxide with relatively large primary particles is suggested for the purpose of improving discharge capacity and cycle characteristics.

SUMMARY OF THE INVENTION

However, even with the technique described in the Patent Literature 1, the improvement of cycle characteristics was not sufficient.

Under the circumstances, an object of the present invention is to provide, with respect to a non-aqueous electrolyte secondary battery, a means capable of suppressing a decrease in capacity when the battery is used for a long period of time, thus improving cycle characteristics.

In this regard, the inventors of the present invention conducted intensive studies. As a result, they found that the aforementioned problems can be solved when the composite oxide containing lithium and nickel as a positive electrode active substance for a non-aqueous electrolyte secondary battery has a structure of secondary particles formed by aggregation of primary particles, the value of the average particle diameter of the primary particles is controlled in a specific range, and having the average particle diameter of the primary particles and the standard deviation of the average particle diameter of the primary particles meet a predetermined relationship. The present invention is completed accordingly.

Specifically, according to one aspect of the present invention, a positive electrode active substance for a non-aqueous electrolyte secondary battery, the positive electrode active substance comprising a composite oxide containing lithium and nickel, is provided. The positive electrode active substance is characterized in that the substance has a structure of secondary particles formed by aggregation of primary particles, that the average particle diameter of the primary particles (D1) is 0.9 µm or less, and that the average particle diameter of the primary particles (D1) and the standard deviation ($\sigma$) of the average particle diameter of the primary particles (D1) meet the relationship of $D1/\sigma^2 \geq 24$.

DESCRIPTION OF EMBODIMENTS

Figure 1A:
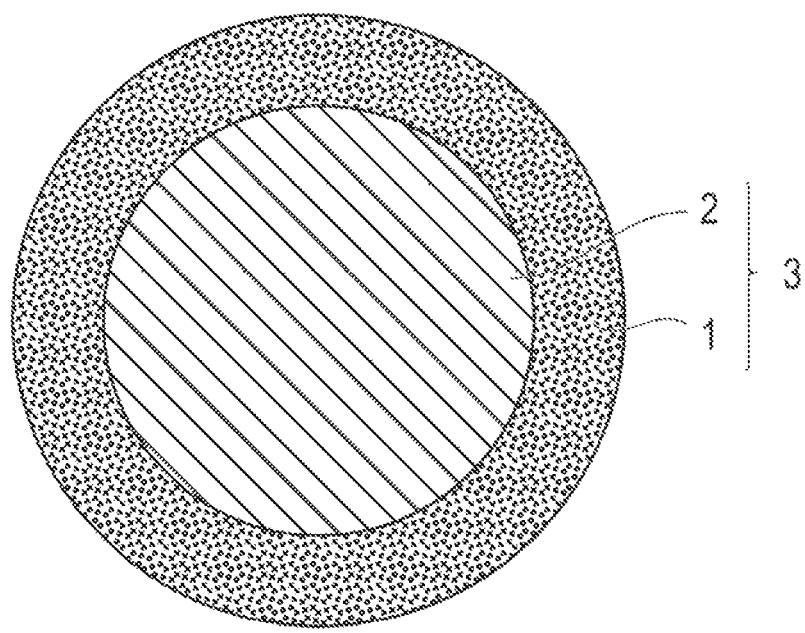
FIG. 1A is a cross-sectional view schematically illustrating one embodiment of a core-shell type positive electrode material.

According to one aspect of the present invention, there is provided a positive electrode active substance for a non-aqueous electrolyte secondary battery comprising a composite oxide containing lithium and nickel having a structure of secondary particles formed by aggregation of primary particles, the average particle diameter of the primary particles (D1) is 0.9 μm or less, and the average particle diameter of the primary particles (D1) and the standard deviation (σ) of the average particle diameter of the primary particles (D1) meet the relationship of $D1/\sigma^2 \geq 24$. According to the positive electrode active substance for a non-aqueous electrolyte secondary battery of this aspect, as the average particle diameter of the primary particles (D1) is small, the displacement amount involved with shrinkage and expansion of active substance particles can be kept at low level in the first place. Furthermore, since the average particle diameter of the primary particles (D1) and the standard deviation (σ) of the average particle diameter of the primary particles (D1) meet a predetermined relationship, variation of the D1 can be suppressed. As a result, miniaturization (cracking) of the secondary particles by breakage of crystal structure caused by shrinkage and expansion of active substance can be suppressed. Consequently, a non-aqueous electrolyte secondary battery which exhibits a little decrease in capacity when the battery is used for a long period of time and has excellent cycle characteristics can be provided.

Herein, in the composite oxide containing lithium and nickel, shrinkage and expansion of the composite oxide occur in conjunction with desorption and insertion of lithium ions when charging and discharging is performed according to desorption and insertion of lithium ions as described above. As such, there has been a problem in that a great decrease in capacity occurs in accordance with repeated charge and discharge cycles as caused by a factor such as the collapse of the crystal structure or the like, and a decrease in capacity (decrease in cycle characteristics) becomes significant when the battery is used for a long period of time.

Such decrease in cycle characteristics becomes more significant in a battery with layered structure, in particular, a battery installed in an automobile. Since the battery with layered structure, in particular, a battery installed in an automobile, has a large size unlike a battery generally used for a mobile phone or a mobile personal computer, there is a concern regarding an occurrence of huge temperature difference between inside and outside thereof. In a battery with layered structure, the inside of the battery in a layered direction is most prone to temperature increase and it is believed that the temperature thereof decreases toward the end part due to heat discharge through an outer case. The positive electrode material having a layered rock salt structure such as a lithium-nickel composite oxide has temperature dependency of the reaction so that the crystal structure is easily collapsed in accordance with temperature increase. In this regard, it is believed that, in accordance with easy insertion and desorption of lithium ions according to temperature increase, frequency of the shrinkage and expansion of a composite oxide is increased. Namely, as the temperature unevenness easily occurs in a layered direction, the unevenness in a degree of expansion and shrinkage of a positive electrode material also occurs in a layered type battery. When a battery is used for a long period of time, peeling of particles may easily occur in an area with high temperature load due to shrinkage and expansion of the material of a positive electrode active substance. Accordingly, it is believed that a decrease in battery capacity is yielded.

Furthermore, when such a composite oxide is applied to a non-aqueous electrolyte secondary battery, in particular, a battery installed in an automobile, significantly longer service life of the secondary battery is required as compared with the case of the application for electric and mobile electronic devices of a related art. For use in electric and mobile electronic devices of a related art, for example, about 500 cycles may be sufficient to the most. However, for a battery installed in an automobile, it is necessary to maintain capacity at certain level or above even at a cycle number of 1000 to 1500 cycles. Until now, there have been no enough studies made for a lithium nickel-based composite oxide which can endure such long-term cycle.

In addition, when the non-aqueous electrolyte secondary battery is used as a power source of an automobile or the like, it is required to have a high volume energy density to further increase a cruising distance.

While keeping in mind the battery for an automobile which is involved with such strict requirements, the inventors of the present invention conducted studies on a lithium nickel-based composite oxide that can be used for a secondary battery with high volume energy density with improved cycle characteristics.

As a result, the inventors of the present invention found that a positive electrode active substance with excellent cycle characteristics can be provided while suppressing a decrease in volume energy density by controlling the value of the average particle diameter of the primary particles (D1) and the relationship between the average particle diameter of the primary particles (D1) and the standard deviation (σ) of the average particle diameter of the primary particles (D1) in a specific range in a lithium nickel-based composite oxide having a structure of secondary particles formed by aggregation of primary particles.

The positive electrode active substance according to this aspect is not specifically limited in terms of the composition as long as it comprises a composite oxide containing lithium and nickel. Representative examples of the composite oxide containing lithium and nickel include a lithium nickel composite oxide ($LiNiO_2$). However, a composite oxide in which part of the nickel atoms of a the lithium nickel composite oxide is replaced with another metal atom is more preferable. As a preferable example, a lithium-nickel-manganese-cobalt composite oxide (hereinbelow, also simply referred to as "NMC composite oxide") has a layered crystal structure in which a lithium atom layer and a transition metal (Mn, Ni, and Co are arranged with regularity) atom layer are alternately stacked via an oxygen atom layer, one Li atom is included per atom of transition metal M and extractable Li amount is twice the amount of spinel lithium manganese oxide, that is, as the supply power is two times higher, it can have high capacity. In addition, as having higher heat stability compared to $LiNiO_2$, it is particularly advantageous among the nickel composite oxides that are used as a positive electrode active substance.

As described herein, the NMC composite oxide includes a composite oxide in which part of transition metal elements are replaced with another metal element. In that case, examples of another element include Ti, Zr, Nb, W, P, Al, Mg, V, Ca, Sr, Cr, Fe, B, Ga, In, Si, Mo, Y, Sn, V, Cu, Ag, and Zn. Preferably, it is Ti, Zr, Nb, W, P, Al, Mg, V, Ca, Sr, or Cr. More preferably, it is Ti, Zr, P, Al, Mg, or Cr. From the viewpoint of improving the cycle characteristics, it is even more preferably Ti, Zr, Al, Mg, or Cr.

By having high theoretical discharge capacity, the NMC composite oxide preferably has a composition represented by General Formula (1): $Li_aNi_bMn_cCo_dM_xO_2$ (with the proviso that, in the formula, a, b, c, d, and x satisfy $0.9 \leq a \leq 1.2$, $0 < b < 1$, $0 < c \leq 0.5$, $0 < d \leq 0.5$, $0 \leq x \leq 0.3$, and b+c+d=1. M represents at least one element selected from Ti, Zr, Nb, W, P, Al, Mg, V, Ca, Sr, and Cr). Herein, a represents the atomic ratio of Li, b represents the atomic ratio of Ni, c represents the atomic ratio of Mn, d represents the atomic ratio of Co, and x represents the atomic ratio of M. From the viewpoint of the cycle characteristics, it is preferable that $0.4 \leq b \leq 0.6$ in the General Formula (1). Meanwhile, composition of each element can be measured by induction coupled plasma (ICP) spectroscopy.

In general, from the viewpoint of improving purity and improving electron conductivity of a material, nickel (Ni), cobalt (Co) and manganese (Mn) are known to contribute to capacity and output characteristics. Ti or the like replaces part of transition metal in a crystal lattice. From the viewpoint of the cycle characteristics, it is preferable that part of transition element are replaced by another metal element, and it is preferable that $0 < x \leq 0.3$ in the General Formula (1), in particular. It is believed that the crystal structure is stabilized by dissolving at least one selected from the group consisting of Ti, Zr, Nb, W, P, Al, Mg, V, Ca, Sr and Cr so that decrease in capacity of a battery is prevented even after repeated charge and discharge, and thus, excellent cycle characteristics can be achieved.

With regard to the NMC composite oxide, the inventors of the present invention found that the influence of deformation and cracking of a composite oxide during charge and discharge described above becomes higher if the metal composition of nickel, manganese and cobalt is heterogeneous like $LiNi_{0.5}Mn_{0.3}Co_{0.2}O_2$. This is believed because, as the metal composition is heterogeneous, deformation is caused in stress applied to the inside of a particle during expansion and shrinkage so that cracks are more easily generated in the composite oxide. Thus, when comparison is made with a composite oxide having a rich Ni abundance ratio (for example, $LiNi_{0.8}Mn_{0.1}Co_{0.1}O_2$) or a composite oxide with a homogenous abundance ratio of Ni, Mn and Co (for example, $LiNi_{0.3}Mn_{0.3}Co_{0.3}O_2$), more significant decrease in long-term cycle characteristics is yielded. By having the structure according to this aspect, it was found that the cycle characteristics are surprisingly improved even for a composite oxide having a heterogeneous metal composition like $LiNi_{0.5}Mn_{0.3}Co_{0.2}O_2$.

Thus, the positive electrode active substance with a composite oxide in which b, c, and d in the General Formula (1) satisfy $0.44 \leq b \leq 0.51$, $0.27 \leq c \leq 0.31$, and $0.19 \leq d \leq 0.26$ is preferable in that the effect of the present invention is obtained at significant level.

The positive electrode active substance according to this aspect has a structure of secondary particles formed by aggregation of primary particles. In addition, the average particle diameter of the primary particles (D1) is 0.9 µm or less. By having such structure, a displacement amount of shrinkage and expansion of active substance particles can be kept at low level. Furthermore, the average particle diameter of the primary particles (D1) and the standard deviation (s) of the average particle diameter of the primary particles (D1) meet the relationship of $D1/\sigma^2 \geq 24$. As the D1 and the σ meet such a relationship, variation of the D1 can be suppressed. As a result, miniaturization (cracking) of the secondary particles by breakage of crystal structure caused by shrinkage and expansion of active substance can be suppressed. Consequently, it is speculated that, by having a little decrease in capacity even when the battery is used for a long period of time, a non-aqueous electrolyte secondary battery with excellent cycle characteristics is provided. However, the technical scope of the present invention is not limited by this mechanism.

The average particle diameter of the primary particles (D1) is preferably 0.20 to 0.6 µm, and more preferably 0.25 to 0.5 µm. In addition, the average particle diameter of the secondary particles (D2) is preferably 5 to 20 µm, and more preferably 5 to 15 µm. In addition, it is preferable that the ratio value thereof (D2/D1) is higher than 11, it is more preferably 15 to 50, and further preferably 25 to 40. Meanwhile, the primary particles forming the lithium nickel-based composite oxide generally have a crystal structure of hexagonal crystal package with layered structure. The largeness of the diameter of crystallite is related to the largeness of D1. As described herein "crystallite" indicates the largest group which can be determined as a monocrystal, and it can be measured by the method of refining structure parameters of a crystal from diffraction intensity that is obtained by powder X ray diffraction measurement or the like. The specific value of the crystallite diameter is, although not particularly limited, preferably 1 µm or less, more preferably 0.55 µm or less, and even more preferably 0.4 µm or less. By having such a structure, the displacement amount involved with shrinkage and expansion of an active substance can be further reduced and an occurrence of micronization (cracking) of the secondary particles accompanying repetition of charge and discharge is inhibited, which can further contribute to improvement of the cycle characteristics. Meanwhile, the lower limit of the diameter of the crystallite is, although not particularly limited, generally 0.02 µm or more. In the present specification, the values measured by the method described in the following Examples are used as values of D1, D2 and the diameter of a crystal of the lithium nickel-based composite oxide.

The tap density of the positive electrode active substance of this aspect is preferably 2.0 g/cm$^3$ or more, more preferably 2.3 g/cm$^3$ or more, and even more preferably 2.4 to 2.9 g/cm$^3$. By having such a structure, high density of the primary particles forming the secondary particles of the positive electrode active substance is sufficiently ensured, and thus the effect of improving the cycle characteristics can be maintained.

In addition, the BET specific surface area of the positive electrode active substance of this aspect is preferably 0.1 to 1.0 m$^2$/g, more preferably 0.3 to 1.0 m$^2$/g, and particularly preferably 0.3 to 0.7 m$^2$/g. As the specific surface area of the active substance is within this range, the reaction area of the active substance is ensured so that the internal resistance of a battery is lowered. As a result, an occurrence of polarization can be suppressed at minimum level at the time of an electrode reaction.

Furthermore, in the positive electrode active substance of this aspect, the diffraction peak of a (104) surface and the diffraction peak of a (003) surface which are obtained by powder X ray diffraction measurement have a diffraction peak intensity ratio ((003)/(104)) of preferably 1.28 or more and more preferably 1.35 to 2.1. Furthermore, the diffraction peak integrated intensity ratio ((003)/(104)) is preferably 1.05 or more, more preferably 1.08 or more, and even more preferably 1.10 to 1.45. Those requirements are preferred due to the following reasons. Specifically, the lithium nickel-based composite oxide has a layered rock salt structure in which Li$^+$ layer and Ni$^{3+}$ layer are present between oxygen layers. However, as Ni$^{3+}$ is easily reduced to Ni$^{2+}$ and the ionic radius of Ni$^{2+}$ (0.83 Å) is substantially equal to the ionic radius of Li$^+$ (0.90 Å), it is easy for Ni$^{2+}$ to be incorporated into a Li$^+$ defect site which is generated during synthesis of the active substance. Once Ni$^{2+}$ is incorporated into the Li$^+$ site, an electrochemically unstable structure is formed locally, and also diffusion of Li$^+$ is inhibited. For such reasons, when an active substance with low crystallinity is used, there is a possibility that the battery charge and discharge capacity is lowered or durability is impaired. Thus, as an indicator of this crystallinity, the aforementioned requirements are employed. Herein, as a method for quantifying the crystallinity, the diffraction peak intensity ratio of a (003) surface to a (104) surface and the integrated intensity ratio of diffraction peak, based on crystal structure analysis using X ray diffraction as described above, were used. When these parameters satisfy the above requirements, there are fewer defects within a crystal so that a decrease in battery charge and discharge capacity or impairment of durability can be suppressed. Meanwhile, the parameters of crystallinity can be controlled based on a raw material, a composition, conditions for calcination, or the like.

With the positive electrode active substance of this aspect, a deformation of a structure which is caused by expansion and shrinkage accompanying a charge and discharge cycle can be inhibited, and thus it is believed that peeling of particles caused by expansion and shrinkage in the area with high temperature load can be suppressed. As such, even for a battery which needs to be used for a long period of time as a layered-structure type battery for an automobile, a decrease in capacity caused by use for a long period of time is inhibited.

The lithium nickel-based composite oxide such as the NMC composite oxide according to this aspect can be produced by selecting various known methods such as a co-precipitation method and a spray drying method. From the viewpoint of having easy production of the composite oxide according to this aspect, a co-precipitation method is preferably used. Specifically, with regard to a method for synthesizing the NMC composite oxide, production can be made by, for example, a method described in JP 2011-105588 A (corresponding to US 2013/045421 A which is entirely incorporated herein by reference) in which a nickel-cobalt-manganese composite oxide is produced by the co-precipitation method and the nickel-cobalt-manganese composite oxide is admixed with a lithium compound followed by calcination. Specific descriptions are given hereinbelow.

Raw material compounds of a composite oxide, for example, a Ni compound, a Mn compound, or a Co compound, are dissolved in a suitable solvent such as water so as to have a desired composition of an active substance material. Examples of the Ni compound, the Mn compound and the Co compound include sulfate, nitrate, carbonate, acetate, oxalate, oxide, hydroxide, and halide of the metal element. Specific examples of the Ni compound, the Mn compound and the Co compound include nickel sulfate, cobalt sulfate, manganese sulfate, nickel acetate, cobalt acetate, and manganese acetate, but not limited thereto. During the process, if necessary, in order to have a desired composition of an active substance, a compound containing at least one metal element such as Ti, Zr, Nb, W, P, Al, Mg, V, Ca, Sr or Cr as a metal element for replacing part of the layered lithium metal composite oxide which forms the active substance may be further incorporated.

A co-precipitation reaction can be performed by neutralization and precipitation reactions using the above raw material compounds and an alkali solution. Accordingly, metal composite hydroxide or metal composite carbonate containing the metal included in the above raw material compounds can be obtained. Examples of the alkali solution which can be used include an aqueous solution of sodium hydroxide, potassium hydroxide, sodium carbonate, or ammonia. For the neutralization reaction, it is preferable to use sodium hydroxide, sodium carbonate, or a mixture solution thereof. In addition, it is preferable to use an aqueous ammonia solution or ammonia salt for a complex reaction.

The addition amount of the alkali solution used for neutralization reaction is sufficient to have the equivalent ratio of 1.0 to components to be neutralized which are contained in the whole metal salts. However, for having pH control, it is preferably added together with an excess alkali amount.

The aqueous ammonia solution or ammonia salt used for a complex reaction is preferably added such that the ammonia concentration in the reaction solution is in a range of 0.01 to 2.00 mol/l. The pH of the reaction solution is preferably controlled in a range of 10.0 to 13.0. The reaction temperature is preferably 30° C. or higher, and more preferably 30 to 60° C.

The composite hydroxide obtained by co-precipitation reaction is then preferably filtered by suction, washed with water, and dried. Meanwhile, by controlling the conditions for performing the co-precipitation reaction (for example, stirring time and alkali concentration), particle diameter of the composite hydroxide can be controlled, and it has an influence on the average particle diameter of the secondary particles ($D2$) of a positive electrode active substance which is finally obtained.

Subsequently, by mixing and calcining nickel-cobalt-manganese composite hydroxide with a lithium compound, the lithium-nickel-manganese-cobalt composite oxide can be obtained. Examples of the Li compound include lithium hydroxide or a hydrate thereof, lithium peroxide, lithium nitrate and lithium carbonate.

The calcination, treatment can be performed by one step, but it is preferably performed by two steps (temporary calcination and main calcination). According to two-step calcination, a composite oxide can be obtained efficiently. The conditions for temporary calcination are not particularly limited, and they may vary depending on the lithium raw material or the like, and thus cannot be unambiguously defined. Here, as the factors for controlling $D1$ and $\sigma$ (and also $D1/\sigma^2$) and crystallite diameter in particular, calcination temperature and calcination time for calcination (temporary calcination and main calcination in the case of a two-step calcination.) are particularly important. By making a control of them based on the tendency described below, $D1$ and $\sigma$ (and also $D1/\sigma^2$) and the crystallite diameter can be controlled. Namely, $D1$, $\sigma$ and crystallite particle diameter are increased by having longer calcination time, $D1$, $\sigma$ and crystallite particle diameter are also increased by increasing the calcination temperature. Meanwhile, the temperature increase rate is preferably 1 to 20° C/minute from room temperature. Furthermore, the atmosphere is preferably either air or oxygen atmosphere. Here, when the NMC composite oxide is synthesized by using lithium carbonate as the Li raw material, temperature for temporary calcination is preferably 500 to 900° C., more preferably 600 to 800° C., and even more preferably 650 to 750° C. Furthermore, time for temporary calcination is preferably 0.5 to 10 hours and more preferably 4 to 6 hours. Meanwhile, as for the conditions for main calcination, the temperature increase rate is preferably 1 to 20° C/minute from room temperature, although it is not particularly limited thereto. Furthermore, the atmosphere is preferably either air or oxygen atmosphere. Here, when the NMC composite oxide is synthesized by using lithium carbonate as the Li raw material, temperature for calcination is preferably 800 to 1200° C., more preferably 850 to 1100° C., and even more preferably 900 to 1050° C. Furthermore, time for calcination is preferably 1 to 20 hours and more preferably 8 to 12 hours.

When a tiny amount of a metal element for replacing part of the layered lithium metal composite oxide forming an active substance material is added as needed, any means such as mixing it in advance with nickel, cobalt, manganate salt, adding it simultaneously with nickel, cobalt, lithium manganate salt, adding it to a reaction solution during the reaction, or adding it to the nickel-cobalt-manganese composite oxide with a Li compound can be employed.

The composite oxide of the present invention can be produced by suitably controlling the reaction conditions such as pH of a reaction solution, reaction temperature, reaction concentration, addition rate, and time for stirring.

According to one embodiment of the positive electrode active substance of this aspect, a positive electrode material for a non-aqueous electrolyte secondary battery of core-shell type, which has a core part containing the positive electrode active substance according to the aforementioned first aspect and a shell part containing a lithium-containing composite oxide that is different from the positive electrode active substance, is provided.

Figure 1B:
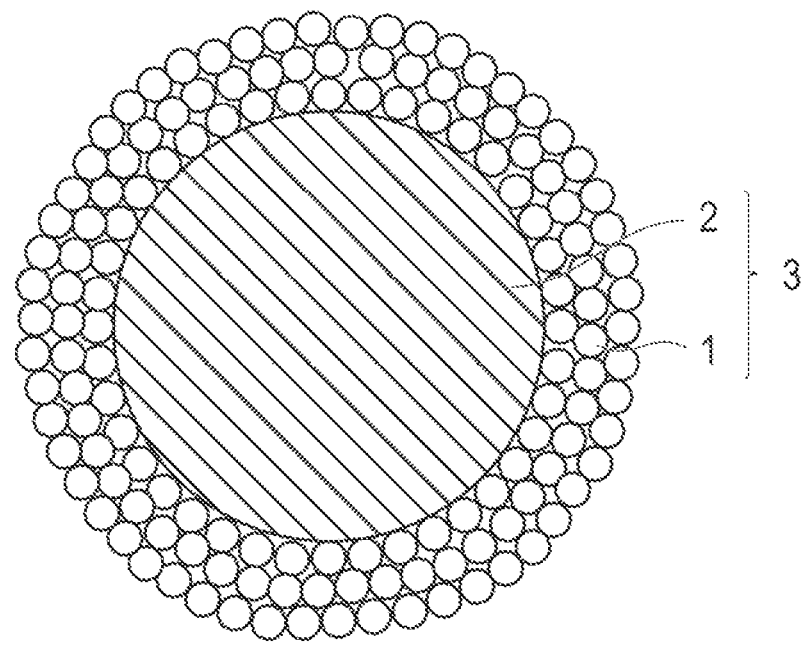
FIG. 1B is a cross-sectional view schematically illustrating another embodiment of a core-shell type positive electrode material.

FIG. 1A is a schematic cross-sectional view of an active substance particle as one embodiment of the core-shell type positive electrode material, in which the inside of the particles has a structure of the core-shell type structure due to different active substance materials. In FIG. 1A and FIG. 1B, 1 indicates a shell part of a positive electrode material, 2 indicates a core part of a positive electrode material, and 3 indicates a positive electrode material. With this core-shell structure, cycle characteristics of a non-aqueous electrolyte secondary battery are further improved. According to the study by the present inventors, it was verified that only the particle surface layer part has a reduction in Ni valency, as a result of analyzing the NMC composite oxide particles after cycle durability test. Based on this, the preset inventors made a presumption that, as Ni on particle surface layer part is inactivated, it actually may not contribute to charge and discharge. Subsequently, it was assumed that further improvement of the cycle characteristics can be obtained by having the NMC composite oxide with low Ni concentration or a material other than Ni on a topical area prone to deterioration, and it was consequently proven.

The core part can be a single layer (monolayer) or has a structure of two or more layers. Examples of the embodiment in which the core part is composed of two or more layers include (1) a structure in which plural layers are stacked, from the surface to the center of the core part, in concentric circle shape and (2) a structure in which content varies continuously from the surface to the center of the core part. In those cases, by modifying the material for each layer or modifying the mixing ratio of two or more active substance materials, a change can be made such that performances such as capacity or output increase or decrease from the surface to the center of the core part (functional gradient). Furthermore, the present invention may include production by a granulation technique using two or more materials. For example, (3) a sea-island structure in which different materials are sprinkled in an island shape within a matrix material is also possible. It can be also (4) a structure in which different materials are present on a hemisphere part of the core particles. It can be also (5) a secondary particle (aggregated) structure in which groups of microparticles consisting of different materials are put together and granulated by solidification. It can be also a structure in which the above (1) to (5) are suitably combined. From the viewpoint of the easy production, and lowering the number of kinds of material and production steps (lowering the cost for material and production), it is preferable to have a single layer (monolayer) structure.

The shape of the core part may be, although not particularly limited, a sphere shape, a cubic shape, a rectangle shape, an ellipsoid shape, a needle shape, a plate shape, a prism shape, a column shape, and an amorphous shape. It is preferably a sphere shape or an ellipsoid shape.

The shell part may be formed on an outer side (outer layer) of the core part, and it may be a single layer (monolayer) or has a structure of two or more layers.

Furthermore, the shell part is not limited to the form in which it covers the entire core part, and it may coat only part of the core part (a composite oxide of a shell part is sprinkled on a surface of a composite oxide of the core part and part of the surface of the core part may remain exposed).

Furthermore, the shell part may be present in a layered form so as to coat the entire surface of the core part (see, FIG. 1A), or it may be present to cover (impregnate) the entire surface of the core part by using plural microparticles (powder) (see, FIG. 1B).

Examples of the embodiment of preparing the shell part to have two or more layers include the structures (1) to (5) that are described above for the core part.

The lithium composite oxide contained in the shell part is not particularly limited as long as it is a lithium-containing composite oxide which is different from the aforementioned positive electrode active substance according to the first aspect of the present invention. Specific examples thereof include lithium manganate of a spinel structure such as $LiMn_2O_4$, lithium manganate such as $LiMnO_2$ and $Li_2MnO_3$, a lithium nickel-based composite oxide having a composition different from the positive electrode active substance according to the aforementioned first aspect (for example, the NMC composite oxide), lithium cobalt acid such as $LiCoO_2$, lithium nickel acid such as $LiNiO_2$, lithium iron oxide such as $LiFeO_2$, and lithium iron phosphate such as $LiFePO_4$. Among them, from the viewpoint of the cycle characteristics, the lithium nickel-based composite oxide having a composition different from the positive electrode active substance according to the aforementioned first aspect (for example, the NMC composite oxide), lithium nickel acid, or a manganese positive electrode active substance of a spinel type is preferable. More preferably, it is the NMC composite oxide having a composition different from the positive electrode active substance according to the aforementioned first aspect (preferably, it is represented by General Formula (2): $Li_{a'}Ni_{b'}Co_{c'}Mn_{d'}M_{x'}O_2$ (with the proviso that, in General Formula (2), a', b', c', d', and x' satisfy $0.9 \leq a' \leq 1.2$, $0 < b' < 1$, $0 < c' \leq 0.5$, $0 < d' \leq 0.5$, $0 \leq x' \leq 0.3$, and b'+c'+d'=1. M includes at least one element selected from Ti, Zr, Nb, W, P, Al, Mg, V, Ca, and Sr)).

Furthermore, the positive electrode active substance contained in the core part is preferably a composite oxide in which b, c and d of the General Formula (1) are as follows: $0.44 \leq b \leq 0.51$, $0.27 \leq c \leq 0.31$, $0.19 \leq d \leq 0.26$, and the composite oxide contained in the shell part is preferably a lithium nickel-based composite oxide having a composition different from the positive electrode active substance according to the aforementioned first aspect, and more preferably the NMC composite oxide having a composition different from the positive electrode active substance of the aforementioned first aspect.

The composite oxide contained in the shell part maybe a single layer (monolayer) or has a structure of two or more layers. When the shell part is composed of two or more layers, a single type of an active substance material may be used for each layer, or two or more materials may be mixed and used for each layer.

In a positive electrode material having this core-shell type structure, the shell part is preferably 1 to 30% by weight, and more preferably 1 to 15% by weight relative to 100% by weight of the core part. Meanwhile, the positive electrode material having a core-shell type structure can be produced according to a method described in JP 2007-213866 A.

According to still another aspect of the present invention, a positive electrode material obtained by having the positive electrode active substance according to the aforementioned first aspect of the present invention and a spinel type manganese positive electrode active substance in a mixed state is provided. The present inventors found that the NMC composite oxide has a problem in that it has a great voltage lowering during high output discharge at low temperature, for example, insufficient output of an automobile in a cold region. In this connection, they found that, by mixing the NMC composite oxide with a spinel type manganese positive electrode active substance, voltage lowering during high output discharge at low temperature is reduced and also insufficient output of an automobile in a cold region is improved.

The mixing weight ratio between the positive electrode active substance according to the aforementioned first aspect and the spinel type manganese positive electrode active substance is, from the viewpoint of the cycle characteristics, preferably as follows: positive electrode active substance according to the aforementioned first aspect:spinel type manganese positive electrode active substance=50:50 to 90:10. From the viewpoint of the balance in capacity, service life, and heat stability, it is more preferably 70:30 to 90:10.

According to still another aspect of the present invention, a positive electrode obtained by forming, on a surface of a positive electrode current collector, a layer of a positive electrode active substance containing at least one selected from the group consisting of the positive electrode active substance according to the aforementioned first aspect of the present invention, a positive electrode material of a core-shell type, and a positive electrode material resulting from mixing of the positive electrode active substance according to the aforementioned first aspect and the spinel type manganese positive electrode active substance is provided.

Meanwhile, it is needless to say that the positive electrode may contain other positive electrode active substance which plays a role as an active substance. However, the total content of the material selected from the group consisting of the positive electrode active substance according to the aforementioned first aspect of the present invention, a positive electrode material of a core-shell type, and a positive electrode material resulting from mixing of the positive electrode active substance according to the aforementioned first aspect and the spinel type manganese positive electrode active substance is preferably 80 to 100% by weight, more preferably 95 to 100% by weight, and even more preferably 100% by weight relative to 100% by weight of the material which can function as a positive electrode active substance to be contained in the positive electrode active substance layer.

If necessary, the positive electrode active substance layer further contains other additives such as a conductive aid, a binder, an electrolyte (for example, polymer matrix, ion conductive polymer, and electrolyte solution), and lithium salt for enhancing ion conductivity in addition to the active substance.

The content of the material capable of functioning as a positive electrode active substance is preferably 85 to 99.5% by weight in the positive electrode active substance layer.
(Binder)

A binder used for the positive electrode active substance layer is not particularly limited and the following materials can be mentioned; thermoplastic polymers such as polyethylene, polypropylene, polyethylene terephthalate (PET), polyether nitrile, polyacrylonitrile, polyimide, polyamide, cellulose, carboxymethyl cellulose (CMC) and a salt thereof, an ethylene-vinyl acetate copolymer, polyvinylidene chloride, styrene-butadiene rubber (SBR), isoprene rubber, butadiene rubber, ethylene-propylene rubber, an ethylene-propylene-diene copolymer, a styrene-butadiene-styrene block copolymer and a hydrogen-added product thereof, and a styrene-isoprene-styrene block copolymer and a hydrogen-added product thereof, fluorine resins such as polyvinylidene fluoride (PVdF), polytetrafluoroethylene (PTFE), a tetrafluoroethylene-hexafluoropropylene copolymer (FEP), a tetrafluoroethylene-perfluoroalkyl vinyl ether copolymer (PFA), an ethylene-tetrafluoroethylene copolymer (ETFE), polychlorotrifluoroethylene (PCTFE), an ethylene-chlorotrifluoroethylene copolymer (ECTFE), and polyvinyl fluoride (PVF), vinylidene fluoride-based fluorine rubber such as vinylidene fluoride-hexafluoropropylene-based fluorine rubber (VDF-HFP-based fluorine rubber), vinylidene fluoride-hexafluoropropylene-tetrafluoroethylene-based fluorine rubber (VDF-HFP-TFE-based fluorine rubber), vinylidene fluoride-pentafluoropropylene-based fluorine rubber (VDF-PFP-based fluorine rubber), vinylidene fluoride-pentafluoropropylene-tetrafluoroethylene-based fluorine rubber (VDF-PFP-TFE-based fluorine rubber), vinylidene fluoride-perfluoromethyl vinyl ether-tetrafluoroethylene-based rubber (VDF-PFMVE-TFE-based fluorine rubber), and vinylidene fluoride-chlorotrifluoroethylene fluorine-based rubber (VDF-CTFE-based fluorine rubber), an epoxy resin, and the like. These binders may be each used singly, or two or more thereof may be used in combination.

The amount of the binder contained in the positive electrode active substance layer is not particularly limited as long as the binder can bind the active substance. The amount of binder is preferably 0.5 to 15% by weight, more preferably 1 to 10% by weight with respect to the active substance layer.

If necessary, the positive electrode active substance layer further contains other additives such as a conductive aid, an electrolyte (for example, polymer matrix, ion conductive polymer, and electrolyte solution), and lithium salt for enhancing ion conductivity.

The conductive aid means an additive which is blended in order to enhance the conductivity of the positive electrode active substance layer or negative electrode active substance layer. Examples of the conductive aid include carbon materials such as carbon black including ketjen black and acetylene black; graphite; and carbon fiber. When the active substance layer contains a conductive aid, an electron network in the inside of the active substance layer is formed effectively, and it can contribute to improvement of the output characteristics of a battery.

Examples of the electrolyte salt (lithium salt) include $Li(C_2F_5SO_2)_2N$, $LiPF_6$, $LiBF_4$, $LiClO_4$, $LiAsF_6$, and $LiCF_3SO_3$.

Examples of the ion conductive polymer include polyethylene oxide (PEO)-based and polypropylene oxide (PPO)-based polymer.

A blending ratio of the components that are contained in the positive electrode active substance layer and negative electrode active substance layer described below is not particularly limited. The blending ratio can be adjusted by suitably referring to the already-known knowledge about a lithium ion secondary battery. The thickness of each active substance layer is not particularly limited either, and reference can be made to the already-known knowledge about a battery. For example, the thickness of each active substance layer is about 2 to 100 μm.

According to still another embodiment of the present invention, a non-aqueous electrolyte secondary battery having a power generating element including the aforementioned positive electrode, a negative electrode obtained by forming a negative electrode active substance layer on a surface of a negative electrode current collector, and a separator can be provided.

Next, a description will be made of a non-aqueous electrolyte lithium ion secondary battery as a preferred embodiment of the non-aqueous electrolyte secondary battery, but it is not limited thereto. Meanwhile, the same elements are given with the same symbols for the descriptions of the drawings, and overlapped descriptions are omitted. Further, note that dimensional ratios in the drawings are exaggerated for the sake of description, and are different from actual ratios in some cases.

Figure 2:
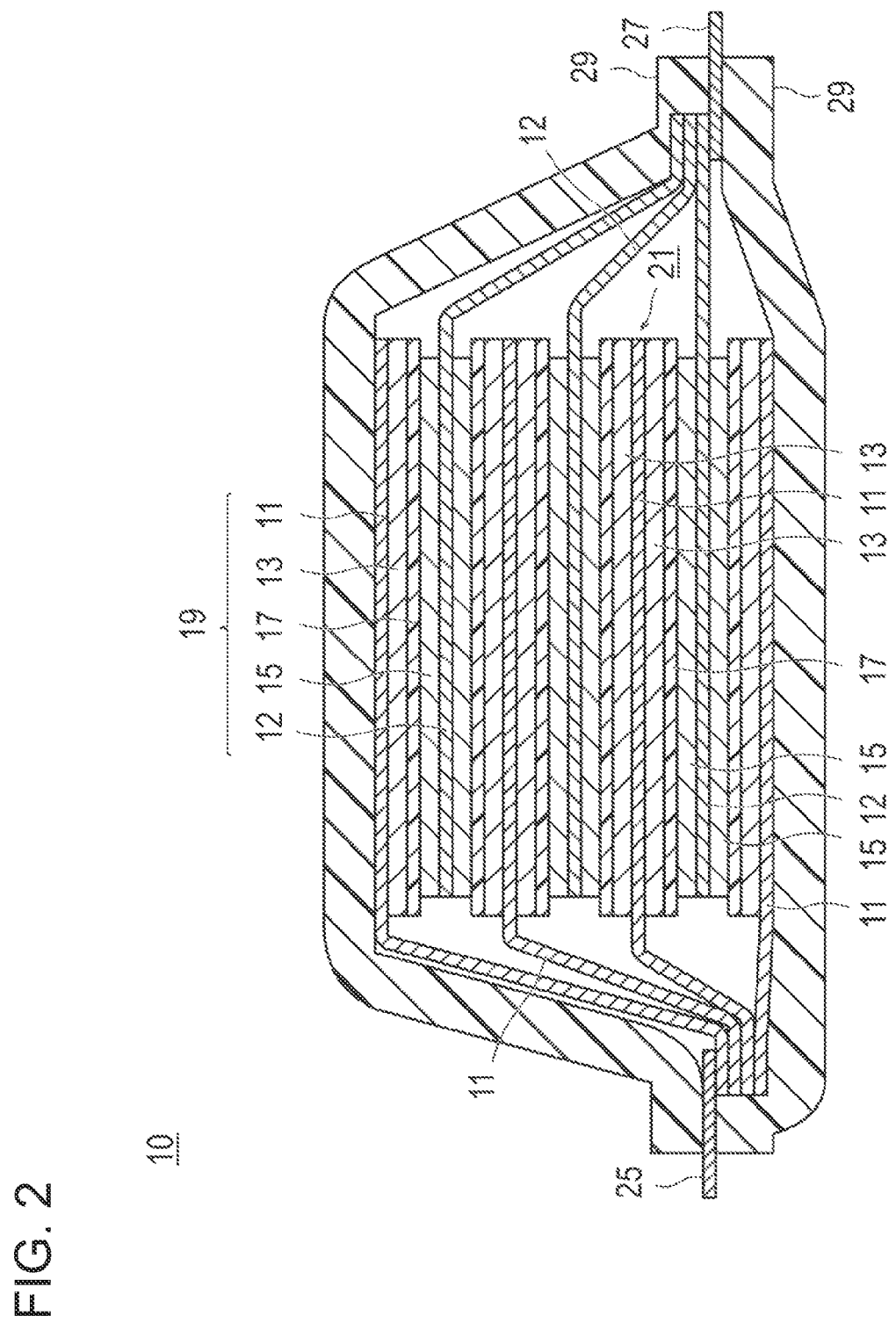
FIG. 2 is a cross-sectional view schematically illustrating the basic structure of a non-aqueous electrolyte lithium ion secondary battery as one embodiment of the non-aqueous electrolyte lithium ion secondary battery, in which the non-aqueous electrolyte lithium ion secondary battery is flat type (stack type) and not a bipolar type.

FIG. 2 is a cross-sectional view schematically illustrating the basic constitution of a non-aqueous electrolyte lithium ion secondary battery which is not a bipolar type of a flat type (stack type) (hereinbelow, it is also simply referred to as a "stack type battery"). As illustrated in FIG. 2, the stack type battery 10 according to this embodiment has a structure in which a power generating element 21 with a substantially rectangular shape, in which a charge and discharge reaction actually occurs, is sealed inside of a battery outer casing material 29 as an outer casing body. Herein, the power generating element 21 has a constitution in which a positive electrode, the separator 17, and a negative electrode are stacked. Meanwhile, the separator 17 has a non-aqueous electrolyte (for example, liquid electrolyte) within it. The positive electrode has a structure in which the positive electrode active substance layer 13 is disposed on both surfaces of the positive electrode current collector 11. The negative electrode has a structure in which the negative electrode active substance layer 15 is disposed on both surfaces of the negative electrode current collector 12. Specifically, one positive electrode active substance layer 13 and the neighboring negative electrode active substance layer 15 are disposed to face each other via the separator 17, and the negative electrode, the electrolyte layer and the positive electrode are stacked in this order. Accordingly, the neighboring positive electrode, electrolyte layer and negative electrode form one single battery layer 19. As such, it can be also said that, as plural single battery layers 19 are stacked, the stack type battery 10 illustrated in FIG. 2 has a constitution in which electrically parallel connection is made among them.

Meanwhile, on the outermost layer positive electrode current collector which is present on both outermost layers of the power generating element 21, the positive electrode active substance layer 13 is disposed only on a single surface. However, an active substance layer may be formed on both surfaces. Namely, not only a current collector exclusive for an outermost layer in which an active substance layer is formed on a single surface can be achieved but also a current collector having an active substance layer on both surfaces can be directly used as a current collector of an outermost layer. Furthermore, by reversing the arrangement of the positive electrode and negative electrode of FIG. 2, it is also possible that the outer most layer negative electrode current collector is disposed on both outermost layers of the power generating element 21 and a negative electrode active substance layer is disposed on a single surface or both surfaces of the same outermost layer negative electrode current collector.

The positive electrode current collector 11 and negative electrode current collector 12 have a structure in which each of the positive electrode current collecting plate (tab) 25 and negative electrode current collecting plate (tab) 27, which conductively communicate with each electrode (positive electrode and negative electrode), is attached and inserted to the end part of the battery outer casing material 29 so as to be led to the outside of the battery outer casing material 29. If necessary, each of the positive electrode current collecting plate 25 and negative electrode current collecting plate 27 can be attached, via a positive electrode lead and negative electrode lead (not illustrated), to the positive electrode current collector 11 and negative electrode current collector 12 of each electrode by ultrasonic welding or resistance welding.

Meanwhile, although a stack type battery is illustrated in FIG. 2 instead of a bipolar type of a flat type (stack type), it can be also a bipolar type battery containing a bipolar type electrode which has a positive electrode active substance layer electrically bound to one surface of a current collector and a negative electrode active substance layer electrically bound to the opposite surface of the current collector. In that case, one current collector plays both roles of a positive electrode current collector and a negative electrode current collector.

Hereinbelow, each member is described in more detail.

[Negative Electrode Active Substance Layer]

The negative electrode active substance layer contains an active substance, and if necessary, further contains other additives such as a conductive aid, a binder, an electrolyte (for example, polymer matrix, ion conductive polymer, and electrolyte solution), and lithium salt for enhancing ion conductivity. The other additives such as a conductive aid, a binder, an electrolyte (for example, polymer matrix, ion conductive polymer, and electrolyte solution), and lithium salt for enhancing ion conductivity are the same as those described above for the positive electrode active substance layer.

The negative electrode active substance layer preferably contains at least an aqueous binder. The aqueous binder has a high binding property. Further, since water as a raw material is easily available and also only water vapor is generated during drying, there is an advantage that the investment on facilities of a production line can be greatly reduced and an environmental load can be reduced.

The aqueous binder indicates a binder which has water as a solvent or a dispersion medium, and specific examples thereof include a thermoplastic resin, a polymer with rubber elasticity, a water soluble polymer, and a mixture thereof. Herein, the binder which has water as a dispersion medium includes all expressed as latex or an emulsion, and it indicates a polymer emulsified in water or suspended in water. Examples thereof include a polymer latex obtained by emulsion polymerization in a self-emulsifying system.

Specific examples of the aqueous binder include a styrene polymer (styrene-butadiene rubber, styrene-vinyl acetic acid copolymer, styrene-acryl copolymer or the like), acrylonitrile-butadiene rubber, methacrylic acid, methyl-butadiene rubber, (meth)acrylic polymer (polyethylacrylate, polyothylmethacrylate, polypropylacrylate, polymethylmethacrylate (methacrylic acid methyl rubber), polypropylmethaorylate, polyisopropylacrylate, polyisopropylmethacrylate, polybutylacrylate, polybutylmethacrylate, polyhexylacrylate, polyhexylmethacrylate, polyethylhexylacrylate, polyethylhexylmethacrylate, polylaurylacrylate, polylaurylmethacrylate, or the like), polytetrafluoroethylene, polyethylene, polypropylene, an ethylene-propylene copolymer, polybutadiene, butyl rubber, fluororubber, polyethylene oxide, polyepichlorohydrin, polyphosphagen, polyacrylonitrle, polystyrene, an ethylene-propylene-diene copolymer, polyvinylpyridine, chlorosulfonated polyethylene, a polyester resin, a phenol resin, an epoxy resin; polyvinyl alcohol (average polymerization. degree is preferably 200 to 4000, and more preferably 1000 to 3000, and saponification degree is preferably 80%; by mol or more, and more preferably 90% by mol or more) and a modified product thereof (1 to 80% by mol saponified product in a vinyl acetate unit of a copolymer with ethylene/vinyl acetate =2/98 to 30/70 (molar ratio), 1 to 50% by mol partially acetalized product of polyvinyl alcohol, or the like), starch and a modified product (oxidized starch, phosphoric acid esterified starch, cationized starch, or the like), cellulose derivatives (carboxymethyl cellulose, methyl cellulose, hydroxypropyl cellulose, hydroxyethyl cellulose, and a salt thereof), polyvinylpyrrolidone, polyacrylic acid (salt), polyethylene gylcol, a copolymer of (meth)acrylamide and/or (meth) acrylic acid salt [(meth)acrylamide polymer, (meth)acrylamide -(meth) acrylic acid salt copolymer, alkyl (meth) acrylic acid (carbon atom number of 1 to 4) ester-(meth) acrylic acid salt copolymer, or the like], a styrene-maleic acid salt copolymer, a mannich modified product of polyacrylamide, a formalin condensation type resin (urea-formalin resin, melamin- formalin resin or the like), a polyamidepolyamine or dialkylamine-epichlorohydrin copolymer, polyethyleneimine, casein, soybean protein, synthetic protein, and a water soluble polymer such as galactan mannan derivatives. The aqueous binder can be used either singly or in combination of two or more types.

From the viewpoint of a binding property, the aqueous binder preferably contains at least one rubber-based binder selected from a group consisting of styrene-butadiene rubber, acrylonitrile-butadiene rubber, methacrylic acid methylbutadiene rubber, and methacrylic acid methyl rubber. Further, from the viewpoint of having a good binding property, the aqueous binder preferably contains styrene-butadiene rubber.

When styrene-butadiene rubber is used as an aqueous binder, the aforementioned water soluble polymer is preferably used in combination from the viewpoint of improving the coating property. Examples of the water soluble polymer which is preferably used in combination with styrene-butadiene rubber include polyvinyl alcohol and a modified product thereof, starch and a modified product thereof, cellulose derivatives (carboxymethyl cellulose, methyl cellulose, hydroxyethyl cellulose, and a salt thereof), polyvinylpyrrolidone, polyacrylic acid (salt), and polyethylene glycol. Among them, styrene-butadiene rubber and carboxymethyl cellulose (salt) are preferably combined as a binder. The weight content ratio between styrene-butadiene rubber and a water soluble polymer is, although not particularly limited, preferably as follows: styrene-butadiene rubber:water soluble polymer=1:0.1 to 10, and more preferably 0.5 to 2.

In a binder used for the negative electrode active substance layer, the content of the aqueous binder is preferably 80 to 100% by weight, preferably 90 to 100% by weight, and preferably 100% by weight.

Examples of the negative electrode active substance include a carbon material such as graphite, soft carbon, and hard carbon, a lithium-transition metal composite oxide (for example, $Li_4Ti_5O_{12}$), a metal material, and a lithium alloy-based negative electrode material. If necessary, two or more kinds of a negative electrode active substance may be used in combination. Preferably, from the viewpoint of capacity and output characteristics, a carbon material or a lithium-transition metal composite oxide is used as a negative electrode active substance. Meanwhile, it is needless to say that a negative electrode active substance other than those described above can be also used.

The average particle diameter of a negative electrode active substance is, although not particularly limited, preferably 1 to 100 μm, and more preferably 1 to 20 μm from the viewpoint of having high output.

[Separator (Electrolyte Layer)]

A separator has a function of maintaining an electrolyte to ensure lithium ion conductivity between a positive electrode and a negative electrode and also a function of a partition wall between a positive electrode and a negative electrode.

Examples of a separator shape include a porous sheet separator or a non-woven separator composed of a polymer or a fiber which absorbs and maintains the electrolyte.

As a porous sheet separator composed of a polymer or a fiber, a microporous (microporous membrane) separator can be used, for example. Specific examples of the porous sheet composed of a polymer or a fiber include a microporous (microporous membrane) separator which is composed of polyolefin such as polyethylene (PE) and polypropylene (PP); a laminate in which plural of them are laminated (for example, a laminate with three-layer structure of PP/PE/PP), and a hydrocarbon based resin such as polyimide, aramid, or polyfluorovinylydene-hexafluoropropylene (PVdF-HFP), or glass fiber.

The thickness of the microporous (microporous membrane) separator cannot be uniformly defined as it varies depending on use of application. For example, for an application in a secondary battery for operating a motor of an electric vehicle (EV), a hybrid electric vehicle (HEV), and a fuel cell vehicle (FCV), it is preferably 4 to 60 μm as a monolayer or a multilayer. Fine pore diameter of the microporous (microporous membrane) separator is preferably 1 μm or less at most (in general, the pore diameter is about several tens of nanometers).

As a non-woven separator, conventionally known ones such as cotton, rayon, acetate, nylon, polyester; polyolefin such as PP and PE; polyimide and aramid are used either singly or as a mixture. Furthermore, the volume density of a non-woven fabric is not particularly limited as long as sufficient battery characteristics are obtained with an impregnated electrolyte. Furthermore, it is sufficient that the thickness of the non-woven separator is the same as that of an electrolyte layer. Preferably, it is 5 to 200 μm. Particularly preferably, it is 10 to 100 μm.

As described above, the separator also contains an electrolyte. The electrolyte is not particularly limited if it can exhibit those functions, and a liquid electrolyte or a gel polymer electrolyte is used. By using a gel polymer electrolyte, a distance between electrodes is stabilized and an occurrence of polarization is suppressed so that the durability (cycle characteristics) is improved.

The liquid electrolyte has an activity of a lithium ion carrier. The liquid electrolyte constituting an electrolyte solution layer has the form in which lithium salt as a supporting salt is dissolved in an organic solvent as a plasticizer. Examples of the organic solvent which can be used include carbonates such as ethylene carbonate (EC), propylene carbonate (PC), dimethyl carbonate (DMC), diethyl carbonate (DEC), and ethylmethyl carbonate. Furthermore, as a lithium salt, the compound which can be added to an active substance layer of an electrode such as $Li(CF_3SO_2)_2N$, $Li(C_2F_5SO_2)_2N$, $LiPF_6$, $LiBF_4$, $LiClO_4$, $LiAsF_6$, $LiTaF_6$, and $LiCF_3SO_3$ can be similarly used. The liquid electrolyte may further contain an additive in addition to the components that are described above. Specific examples of the compound include vinylene carbonate, methylvinylene carbonate, dimethylvinylene carbonate, phenylvinylene carbonate, diphenylvinylene carbonate, ethylvinylene carbonate, diethylvinylene carbonate, vinylethylene carbonate, 1,2-divinylethylene carbonate, 1-methyl-1-vinylethylene carbonate, 1-methyl-2-vinylethylene carbonate, 1-ethyl-1-vinylethylene carbonate, 1-ethyl-2-vinylethylene carbonate, vinylvinylene carbonate, allylethylene carbonate, vinyloxymethylethylene carbonate, allyloxymethylethylene carbonate, acryloxymethylethylene carbonate, methacryloxymethylethylene carbonate, ethynylethylene carbonate, propargylethylene carbonate, ethynyloxymethylethylene carbonate, propargyloxyethylene carbonate, methylene ethylene carbonate, and 1,1-dimethyl-2-methyleneethylene carbonate. Among them, vinylene carbonate, methylvinylene carbonate, and vinylethylene carbonate are preferable. Vinylene carbonate and vinylethylene carbonate are more preferable. Those cyclic carbonate esters may be used either singly or in combination of two or more types.

The gel polymer electrolyte has a constitution that the aforementioned liquid electrolyte is injected to a matrix polymer (host polymer) consisting of an ion conductive polymer. Using a gel polymer electrolyte as an electrolyte is excellent in that the fluidity of an electrolyte disappears and ion conductivity between layers is blocked. Examples of an ion conductive polymer which is used as a matrix polymer (host polymer) include polyethylene oxide (PEO), polypropylene oxide (PPO), polyethylene glycol (PEG), polyacrylronitrile (PAN), polyvinylidene fluoride-hexafluoropropylene (PVdF-HEP), poly(methyl methacrylate (PMMA) and a copolymer thereof.

According to forming of a cross-linked structure, the matrix polymer of a gel electrolyte can exhibit excellent mechanical strength. For forming a cross-linked structure, it is sufficient to perform a polymerization treatment of a polymerizable polymer for forming a polymer electrolyte (for example, PEO and PPO), such as thermal polymerization, UV polymerization, radiation polymerization, and electron beam polymerization, by using a suitable polymerization initiator.

Furthermore, as a separator, a separator laminated with a heat resistant insulating layer laminated on a porous substrate (a separator having a heat resistant insulating layer) is preferable. The heat resistant insulating layer is a ceramic layer containing inorganic particles and a binder. As for the separator having a heat resistant insulating layer, those having high heat resistance, that is, melting point or heat softening point of 150° C. or higher, preferably 200° C. or higher, are used. By having a heat resistant insulating layer, internal stress in a separator which increases under temperature increase is alleviated so that the effect of inhibiting thermal shrinkage can be obtained. As a result, an occurrence of a short between electrodes of a battery can be prevented so that a battery configuration not easily allowing a performance reduction as caused by temperature increase is yielded. Furthermore, by having a heat resistant insulating layer, mechanical strength of a separator having a heat resistant insulating layer is improved so that the separator hardly has a film breaking. Furthermore, because of the effect of inhibiting thermal shrinkage and a high level of mechanical strength, the separator is hardly curled during the process of fabricating a battery.

The inorganic particles in a heat resistant insulating layer contribute to the mechanical strength or the effect of inhibiting thermal shrinkage of a heat resistant insulating layer. The material used as inorganic particles is not particularly limited. Examples thereof include oxides ($SiO_2$, $Al_2O_3$, $ZrO_2$, $TiO_2$), hydroxides and nitrides of silicon, aluminum, zirconium and titanium, and a composite thereof. The inorganic particles may be derived from mineral resources such as boehmite, zeolite, apatite, kaolin, mullite, spinel, olivine, and mica, or artificially synthesized. Furthermore, the inorganic particles may be used either singly or in combination of two or more types. From the viewpoint of the cost, it is preferable to use silica ($SiO_2$) or alumina ($Al_2O_3$) among them. It is more preferable to use alumina ($Al_2O_3$).

The weight per unit area of heat resistant particles is, although not particularly limited, preferably 5 to 15 $g/m^2$. When it is within this range, sufficient ion conductivity is obtained and heat resistant strength is maintained, and thus desirable.

The binder in a heat resistant insulating layer has a role of adhering inorganic particles or adhering inorganic particles to a porous resin substrate layer. With this binder, the heat resistant insulating layer is stably formed and peeling between a porous substrate layer and a heat resistant insulating layer is prevented.

The binder used for a heat resistant insulating layer is not particularly limited, and examples thereof which can be used include a compound such as carboxymethyl cellulose (CMC), polyacrylronitrile, cellulose, an ethylene-vinyl acetate copolymer, polyvinyl chloride, styrene-butadiene rubber (SBR), isoprene rubber, butadiene rubber, polyvinylidene fluoride (PVDF), polytetrafluoroethylene (PTFE), polyvinyl fluoride (PVF), and methyl acrylate. Among them, carboxymethyl cellulose (CMC), methyl acrylate, or polyvinylidene fluoride (PVDF) is preferably used. Those compounds may be used either singly or in combination of two or more types.

The content of the binder in a heat resistant insulating layer is preferably 2 to 20% by weight relative to 100% by weight of the heat resistant insulating layer. When the binder content is 2% by weight or more, the peeling strength between the heat resistant insulating layer and a porous substrate layer can be increased and vibration resistance of a separator can be enhanced. Meanwhile, when the binder content is 20% by weight or less, a gap between inorganic particles is maintained at an appropriate level so that sufficient lithium ion conductivity can be ensured.

Regarding the thermal shrinkage rate of a separator having a heat resistant insulating layer, both MD and TD are 10% or less after maintaining for 1 hour at conditions of 150° C., 2 $gf/cm^2$. By using a material with such high heat resistance, shrinkage of a separator can be effectively prevented even when the internal temperature of a battery reaches 150° C. due to increased heat generation amount from a positive electrode. As a result, an occurrence of a short between electrodes of a battery can be prevented, and thus a battery configuration not easily allowing performance reduction due to temperature increase is yielded.

[Current Collector]

The material for forming a current collector is not particularly limited, but metal is preferably used.

Specific examples of the metal include aluminum, nickel, iron, stainless, titanium, copper, and other alloys. In addition to them, a clad material of nickel and aluminum, a clad material of copper and aluminum, or a plating material of a combination of those metals can be preferably used. It can be also a foil obtained by coating aluminum on a metal surface. Among them, from the viewpoint of electron conductivity or potential for operating a battery, aluminum, stainless, and copper are preferable.

The size of the current collector is determined based on use of a battery. When it is used for a large-size battery which requires high energy density, for example, a current collector with large area is used. The thickness of the current collector is not particularly limited, either. The thickness of the current collector is generally about 1 to 100 µm.

[Positive Electrode Current Collecting Plate and Negative Electrode Current Collecting Plate]

The material for forming the current collecting plate (25, 27) is not particularly limited, and a known highly conductive material which has been conventionally used for a current collecting plate for a lithium ion secondary battery can be used. Preferred examples of the material for forming a current collecting plate include metal materials such as aluminum, copper, titanium, nickel, stainless steel (SUS) and an alloy thereof. From the viewpoint of light weightiness, resistance to corrosion, and high conductivity, aluminum and copper are preferable. Aluminum is particularly preferable. Meanwhile, the same material or a different material can be used for the positive electrode current collecting plate 25 and the negative electrode current collecting plate 27.

[Positive Electrode Lead and Negative Electrode Lead]

Further, although it is not illustrated, the current collector 11 and the current collecting plate (25, 27) can be electrically connected to each other via a positive electrode lead or a negative electrode lead. The same material used for a lithium ion secondary battery of a related art can be also used as a material for forming a positive electrode lead and a negative electrode lead. Meanwhile, a portion led from an outer casing is preferably coated with a heat resistant and insulating thermally shrunken tube or the like so that it has no influence on a product (for example, an automobile component, in particular, an electronic device or the like) according to electric leak after contact with neighboring instruments or wirings.

[Battery Outer Casing Body]

As for the battery outer casing body 29, an envelope-shaped casing to cover a power generating element, in which a laminate film including aluminum is contained, can be used in addition to a known metal can casing. As for the laminate film, a laminate film with a three-layer structure formed by laminating PP, aluminum and nylon in order can be used, but not limited thereto. From the viewpoint of having high output and excellent cooling performance, and of being suitably usable for a battery for a large instrument such as EV or HEV, a laminate film is preferable. Furthermore, as the group pressure applied from outside to a power generating element can be easily controlled and thus the thickness of an electrolyte solution layer can be easily controlled to a desired value, an aluminate laminate is more preferred for an outer casing body.

[Cell Size]

Figure 3:
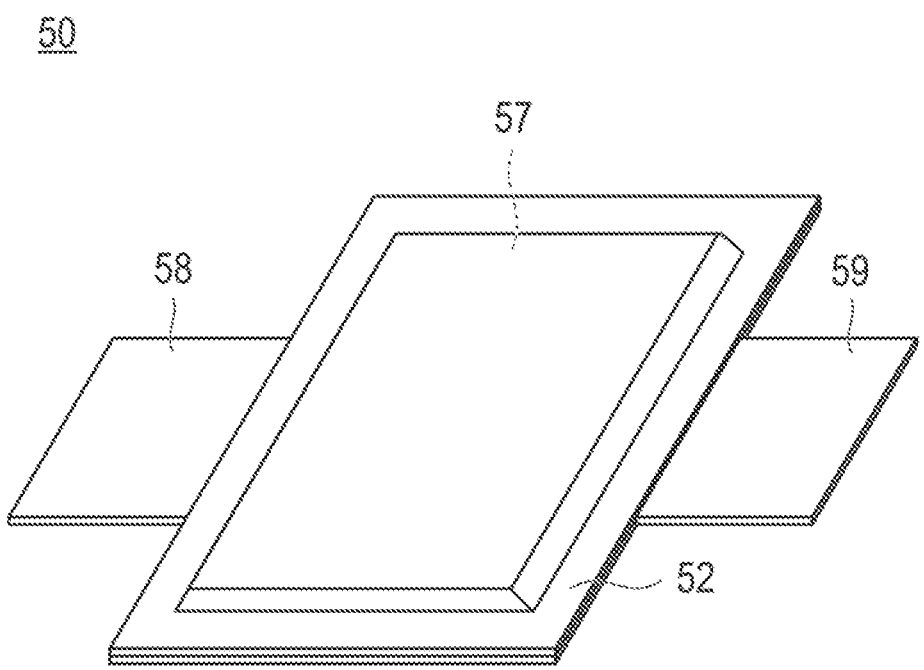
FIG. 3 is a perspective view illustrating the appearance of a flat lithium ion secondary battery as a representative embodiment of a secondary battery.

FIG. 3 is a perspective view illustrating the appearance of a flat lithium ion secondary battery as a representative embodiment of a secondary battery.

As illustrated in FIG. 3, the flat lithium ion secondary battery 50 has a flat and rectangular shape, and from both sides, the positive electrode tab 58 and the negative electrode tab 59 are drawn to extract electric power. The power generating element 57 is covered by the battery outer casing material 52 of the lithium ion secondary battery 50 with its periphery fused by heat. The power generating element 57 is sealed in a state in which the positive electrode tab 58 and the negative electrode tab 59 are led to the outside. Herein, the power generating element 57 corresponds to the power generating element 21 of the lithium ion secondary battery 10 illustrated in FIG. 2 as described above. In the power generating element 57, plural single battery layers (single cell) 19, which are each formed of the positive electrode (positive electrode active substance layer) 13, the electrolyte layer 17 and the negative electrode (negative electrode active substance layer) 15, are laminated.

Meanwhile, the lithium ion secondary battery is not limited to a flat shape of laminate type. The winding type lithium ion secondary battery may have a barrel shape or a flat and rectangular shape obtained by modifying the barrel shape, and it is not particularly limited. As an outer casing material of the barrel shape, a laminate film can be used, and a barrel can (metal can) of a related art can be used, and thus it is not particularly limited. Preferably, the power generating element is encased with an aluminum laminate film. Weight reduction can be achieved with such shape.

Furthermore, drawing of the tabs 58 and 59 illustrated in FIG. 3 is not particularly limited, either. The positive electrode tab 58 and the negative electrode tab 59 may be drawn from the same side or each of the positive electrode tab 58 and negative electrode tab 59 may be divided into plural tabs and drawn from each side, and thus it is not limited to the embodiment illustrated in FIG. 3. Furthermore, in a winding type lithium ion battery, it is also possible to form a terminal by using, for example, a barrel can (metal can) instead of a tab.

A typical electric vehicle has a battery storage space of about 170 L. Since a cell and an auxiliary machine such as a device for controlling charge and discharge are stored in this space, storage space efficiency of a cell is about 50% in general. The cell loading efficiency for this space is a factor of determining the cruising distance of an electric vehicle. As the size of a single cell decreases, the loading efficiency is lowered, and thus it becomes impossible to maintain the cruising distance.

Thus, in the present invention, the battery structure of which power generating element is covered with an outer casing body preferably has a large size. Specifically, length of short side of a laminate cell battery is preferably 100 mm or more. Such large-size battery can be used for an automobile. Herein, the length of short side of a laminate cell battery indicates the length of a shortest side. The upper limit of a length of a short side is, although not particularly limited, generally 400 mm or less.

[Volume Energy Density and Rated Discharge Capacity]

According to the market requirement, a typical electric vehicle needs to have driving distance (cruising distance) of 100 km or more per single charge. Considering such cruising distance, the volume energy density of a battery is preferably 157 Wh/L or more and the rated capacity is preferably 20 Wh or more.

It is also possible to determine the large size of a battery in view of a relationship between battery area or battery capacity, from the viewpoint of a large-sized battery, which is different from a physical size of an electrode. For example, in the case of a flat and stack type laminate battery, for a battery with the ratio value of a battery area (projected area of a battery including an outer casing body of a battery)

to rated capacity is 5 cm²/Ah or more, and with rated capacity of 3 Ah or more, the battery area per unit capacity is large so that a problem of having lowered battery characteristics (cycle characteristics), which is caused by the collapse of the crystal structure and so on accompanying expansion and shrinkage of an active substance, may occur more easily. As such, the non-aqueous electrolyte secondary battery according to this embodiment is preferably a large-sized battery as described above from the viewpoint of having a larger merit obtained from exhibition of the working effects of the present invention. Furthermore, the aspect ratio of a rectangular electrode is preferably 1 to 3, and more preferably 1 to 2. Meanwhile, the aspect ratio of an electrode is defined by longitudinal/transversal ratio of a positive electrode active substance layer with a rectangular shape. By having the aspect ratio in this range, an advantage of having both the performances required for a vehicle and loading space can be obtained.

[Assembled Battery]

An assembled battery is formed by connecting plural batteries. Specifically, at least two of them are used in series, in parallel, or in series and parallel. According to arrangement in series or parallel, it becomes possible to freely control the capacity and voltage.

It is also possible to form a detachable small-size assembled battery by connecting plural batteries in series or in parallel. Furthermore, by connecting again plural detachable small-size assembled batteries in series or parallel, an assembled battery having high capacity and high output, which is suitable for a power source or an auxiliary power source for operating a vehicle requiring high volume energy density and high volume output density, can be formed. The number of the connected batteries for fabricating an assembled battery or the number of the stacks of a small-size assembled battery for fabricating an assembled battery with high capacity can be determined depending on the capacity or output of a battery of a vehicle (electric vehicle) for which the battery is loaded.

[Vehicle]

The non-aqueous electrolyte secondary battery of the present invention can maintain discharge capacity even when it is used for a long period of time, and thus has good cycle characteristics. It also has high volume energy density. For use in a vehicle such as an electric vehicle, a hybrid electric vehicle, a fuel cell electric vehicle, or a hybrid fuel cell electric vehicle, long service life is required as well as high capacity and large size compared to use for an electric and mobile electronic device. As such, the non-aqueous electrolyte secondary battery can be preferably used as a power source for a vehicle, for example, as a power source for operating a vehicle or as an auxiliary power source for operating a vehicle.

Specifically, the battery or an assembled battery formed by combining plural batteries can be mounted on a vehicle. According to the present invention, a battery with excellent long term reliability, output characteristics, and long service life can be formed, and thus, by mounting this battery, a plug-in hybrid electric vehicle with long EV driving distance and an electric vehicle with long driving distance per charge can be achieved. That is because, when the battery or an assembled battery formed by combining plural batteries is used for, for example, a vehicle such as hybrid car, fuel cell electric car, and electric car (including two-wheel vehicle (motor bike) or three-wheel vehicle in addition to all four-wheel vehicles (automobile, truck, commercial vehicle such as bus, compact car, or the like)), a vehicle with long service life and high reliability can be provided. However, the use is not limited to a vehicle, and it can be applied to various power sources of other transportation means, for example, a moving object such as an electric train, and it can be also used as a power source for loading such as an uninterruptable power source device.

EXAMPLES

A description is made below in more detail in view of Examples and Comparative Examples, but the present invention is not limited to the Examples given below.

Example 1

(1) Production of a Positive Electrode Active Substance

To an aqueous solution (1 mol/L) having nickel sulfate, cobalt sulfate, and manganese sulfate dissolved therein, sodium hydroxide and ammonia were continuously supplied at 60° C. to adjust the pH to 11.3, and according to a co-precipitation method, metal composite hydroxide in which nickel, manganese, and cobalt were dissolved at molar ratio of 50:30:20 was produced.

The metal composite hydroxide and lithium carbonate were weighed such that the molar ratio between the total mole number of metals other than Li (Ni, Co, and Mn) and the mole number of Li was 1:1, and then thoroughly mixed. The temperature was increased at temperature increase rate of 5° C./min, temporary calcination was performed at 900° C. for 2 hours in air atmosphere, the temperature was increased at temperature increase rate of 3° C./min, and then main calcination was performed at 920° C. for 10 hours. After cooling to room temperature, the NMC composite oxide ($LiNi_{0.50}Mn_{0.30}Co_{0.20}O_2$) was obtained.

The obtained NMC composite oxide was measured for the average particle diameter of primary particles (D1) and the crystallite diameter, and from the value of D1, the standard deviation ($\sigma$) of D1 and $\sigma^2$ were obtained by calculation. Meanwhile, the measurement of D1 was performed as follows: focused ion beam (FIB) was used to cut a cross-section of the obtained NMC composite oxide, and the cross-sectional image was taken by using a scanning type ion microscope (SIM). Furthermore, D2 can be calculated as the average value of the diameter in long axis direction of at least 50 secondary particles extracted. Meanwhile, as for the D1, at least 200 primary particles were extracted and an average value of the diameter in long axis direction thereof was calculated. Furthermore, the crystallite diameter was measured by Rietveld method by which a crystallite diameter is calculated from diffraction peak intensity obtained by powder X ray diffraction measurement.

Furthermore, the obtained NMC composite oxide was measured for tap density, BET specific surface area and peak intensity ratio (I(003)/I(104)) between the peak intensity (I(104)) of a (104) surface and the peak intensity (I(003)) of a (003) surface by powder X ray diffraction measurement. Meanwhile, for measuring the tap density, a sample powder was added to a 10 ml glass mess cylinder, and after tapping 200 times, powder filling density was measured. Furthermore, the BET specific surface area was measured by single point BET measurement based on continuous fluidization which uses AMS8000 type fully automatic device for measuring powder specific surface area (manufactured by Ohkura Riken Co., Ltd.) and uses nitrogen as the adsorption gas and helium as the carrier gas. Specifically, the sample powder was heated and deaerated at temperature of 150° C. by using mixed gas and cooled to temperature of liquid nitrogen to adsorb mixed gas of nitrogen/helium. Then, it was warmed to room temperature by using water to desorb the adsorbed nitrogen gas and the desorption amount was determined using a thermal conductivity detector. A specific surface area of the sample was then calculated therefrom. Furthermore, for the powder X ray diffraction measurement to calculate the peak intensity ratio (I(003)/I(104)) and the aforementioned crystallite diameter, a X ray diffractometer (manufactured by Rigaku Co., Ltd.) which uses Cu—Kα ray was used. The analysis was then performed by using the Fundamental Parameter. By using X ray diffraction pattern obtained from a diffraction angle range of 2θ=15 to 120° and the analysis software Topas Version 3, the analysis was performed. As for the crystal structure, an assumption was made that it belongs to hexagonal crystal of space group of R-3m in which Li is present in the 3a site, M (Ni, Co, Mn, Al, or the like) is present in the 3b site, x of excess Li, and O is present in the 6c site, and then the crystallite diameter (Gauss) and crystal deformation (Gauss) were obtained. Meanwhile, by assuming that isotropic temperature factor (Beq) is 1, refining was performed until Rwp<10.0, and GOF<1.3. As for the order of refining, Beq was fixed at 1 and, while the z coordinate and site occupancy ratio of oxygen, the crystallite diameter (Gauss), and binding distance between sites remain as variables, the process was repeatedly performed until each variable shows no change.

(2) Production of a Positive Electrode

90% by weight of the positive electrode active substance obtained from (1), 5% by weight of ketjen black as a conductive aid (average particle diameter: 300 nm), 5% by weight of polyvinylidene fluoride (PVDF) as a binder, and a suitable amount of N-methyl-2-pyrrolidone (NMP) as a solvent for controlling slurry viscosity were admixed with one another to prepare a slurry of the positive electrode active substance. Then, the obtained slurry of the positive electrode active substance was coated on an aluminum foil (thickness: 20 μm) as a current collector, dried for 3 minutes at 120° C., and subjected to press molding using a roll press machine to produce a positive electrode in which the coating amount of the positive electrode active substance layer on a single surface is 18 mg/cm$^2$.

(3) Fabrication of a Coin Cell

Next, in a glove box under argon atmosphere, the positive electrode obtained from above (2) was punched to a disc shape with diameter of 14 mm to yield a positive electrode for a coin cell. As a negative electrode, metal lithium punched to a disc shape with diameter of 15 mm was used. Furthermore, as an electrolyte solution, a solution containing 1.0 M LiPF$_6$ dissolved in a mixed solvent of ethylene carbonate (EC) and dimethyl carbonate (DMC) (volume ratio of 1:1) was prepared. The positive electrode and the negative electrode were laminated via a separator (material: polypropylene, thickness: 25 μm), charged to a coin cell container, added with an electrolyte solution and covered with a top cover to produce a coin cell for evaluation. The produced battery was maintained for 24 hours, and once the open circuit voltage (OCV) is stabilized, charging was performed to the cut off voltage of 4.25 V with current density of 0.2 mA/cm$^2$ for the positive electrode to have the initial charge capacity. Then, the capacity at the time of having discharge to cut off voltage of 3.0 V after resting for 1 hour was used as the initial discharge capacity. Furthermore, this charge and discharge cycle was repeated 200 times and the capacity retention rate was obtained and evaluated as cycle durability. Results of the evaluation of each physical property and evaluation of the battery are shown in the Table 1 below. Meanwhile, the obtained coin cell was disintegrated in charged state at 4.25 V, and as a result of performing the differential scanning calorimetry (DSC) of the positive electrode, the exothermic onset temperature was found to be 292° C.

Example 2

The NMC composite oxide (LiNi$_{0.50}$Mn$_{0.30}$Co$_{0.20}$O$_2$) was synthesized in the same manner as the Example 1 described above except that the conditions for the main calcination were changed to 930° C. and 12 hours. As a result, a coin cell was produced and evaluation of each physical property and evaluation of a battery were performed. The results are shown in the Table 1 below.

Example 3

The NMC composite oxide (LiNi$_{0.50}$Mn$_{0.30}$Co$_{0.20}$O$_2$) was synthesized in the same manner as the Example 1 described above except that the conditions for the main calcination were changed to 935° C. and 12 hours. As a result, a coin cell was produced and evaluation of each physical property and evaluation of a battery were performed. The results are shown in the Table 1 below.

Example 4

The NMC composite oxide (LiNi$_{0.50}$Mn$_{0.30}$Co$_{0.20}$O$_2$) was synthesized in the same manner as the Example 1 described above except that the conditions for the main calcination were changed to 940° C. and 12 hours. As a result, a coin cell was produced and evaluation of each physical property and evaluation of a battery were performed. The results are shown in the Table 1 below.

Example 5

The NMC composite oxide (LiNi$_{0.50}$Mn$_{0.30}$Co$_{0.20}$O$_2$) was synthesized in the same manner as the Example 1 described above except that the conditions for the main calcination were changed to 940° C. and 15 hours. As a result, a coin cell was produced and evaluation of each physical property and evaluation of a battery were performed. The results are shown in the Table 1 below.

Example 6

The NMC composite oxide (LiNi$_{0.50}$Mn$_{0.30}$Co$_{0.20}$O$_2$) was synthesized in the same manner as the Example 1 described above except that the conditions for the main calcination were changed to 950° C. and 12 hours. As a result, a coin cell was produced and evaluation of each physical property and evaluation of a battery were performed. The results are shown in the Table 1 below.

Example 7

The NMC composite oxide (LiNi$_{0.50}$Mn$_{0.30}$Co$_{0.20}$O$_2$) was synthesized in the same manner as the Example 1 described above except that the conditions for the main calcination are changed to 980° C. and 12 hours. As a result, a coin cell was produced and evaluation of each physical property and evaluation of a battery were performed. The results are shown in the Table 1 below.

Comparative Example 1

The NMC composite oxide (LiNi$_{0.50}$Mn$_{0.30}$Co$_{0.20}$O$_2$) was synthesized in the same manner as the Example 1 described above except that the conditions for the main calcination were changed to 1000° C. and 10 hours. As a result, a coin cell was produced and evaluation of each physical property and evaluation of a battery were performed. The results are shown in the Table 1 below.

Comparative Example 2

The NMC composite oxide ($LiNi_{0.50}Mn_{0.30}Co_{0.20}O_2$) was synthesized in the same manner as the Example 1 described above except that the conditions for the main calcination were changed to 1000° C. and 20 hours. As a result, a coin cell was produced and evaluation of each physical property and evaluation of a battery were performed. The results are shown in the Table 1 below.

retention rate after 200 cycles was obtained and it was evaluated as cycle durability. The results are shown in the Table 2 below. Meanwhile, the obtained coin cell was disintegrated in charged state at 4.25 V, and as a result of performing the differential scanning calorimetry (DSC) of the positive electrode, the exothermic onset temperature was found to be 305° C.

Example 9

To an aqueous solution having nickel sulfate, cobalt sulfate, and manganese sulfate dissolved therein, sodium hydroxide and ammonia were supplied, and according to a co-precipitation method, metal composite hydroxide in which nickel, cobalt, and manganese were dissolved at

TABLE 1

| | Conditions for temporary calcination for producing NMC composite oxide | | Conditions for main calcination for producing NMC composite oxide | | Average particle diameter of primary particles $D1(\mu m)$ | $\sigma^2$ $(\mu m)^2$ | $D1/\sigma^2$ $1/\mu m$ | Crystallite diameter $\mu m$ | Tap density $g/cm^3$ | BET specific surface area $m^2/g$ | I(003)/I(104) | | Initial discharge capacity mAh/g | Capacity retention rate after 200 cycles % |
|---|---|---|---|---|---|---|---|---|---|---|---|---|---|---|
| | Temperature | Time | Temperature | Time | | | | | | | Peak intensity ratio | Integrated intensity ratio | | |
| Example 1 | 900 | 2 | 920 | 10 | 0.25 | 0.0050 | 50.4 | 0.10 | 2.65 | 0.23 | 1.70 | 1.16 | 167 | 97.1 |
| Example 2 | 900 | 2 | 930 | 12 | 0.29 | 0.0077 | 37.8 | 0.15 | 2.63 | 0.26 | 1.70 | 1.16 | 167 | 95.6 |
| Example 3 | 900 | 2 | 935 | 12 | 0.36 | 0.0086 | 41.4 | 0.27 | 2.32 | 0.48 | 1.62 | 1.14 | 167 | 92.1 |
| Example 4 | 900 | 2 | 940 | 12 | 0.48 | 0.0156 | 30.8 | 0.35 | 2.33 | 0.66 | 1.62 | 1.14 | 167 | 92.5 |
| Example 5 | 900 | 2 | 940 | 15 | 0.49 | 0.0204 | 24.2 | 0.37 | 2.19 | 0.40 | 1.28 | 1.08 | 165 | 77.3 |
| Example 6 | 900 | 2 | 950 | 12 | 0.62 | 0.0207 | 29.8 | 0.66 | 2.09 | 0.55 | 1.43 | 1.16 | 166 | 88.4 |
| Example 7 | 900 | 2 | 980 | 12 | 0.90 | 0.0315 | 28.6 | 0.95 | 2.22 | 0.27 | 1.37 | 1.14 | 160 | 85.3 |
| Comparative Example 1 | 900 | 2 | 1000 | 10 | 1.1 | 0.0583 | 18.9 | 1.15 | 2.01 | 0.52 | 1.51 | 1.14 | 157 | 72.1 |
| Comparative Example 2 | 900 | 2 | 1000 | 20 | 2.3 | 0.1082 | 21.3 | 2.1 | 2.15 | 0.25 | 1.62 | 1.14 | 153 | 75.3 |

From the above results, the Examples 1 to 7 in which the positive electrode active substance according to the present invention is used exhibited higher capacity retention rate after 200 cycles compared to the Comparative Examples 1 and 2, and thus they were found to have excellent cycle durability.

Example 8

Electrolytic manganese dioxide and aluminum hydroxide were admixed with each other and subjected to a heating treatment at 750° C. to yield manganese (III) dioxide. After that, lithium carbonate was added and mixed such that Li/(Mn+Al) molar ratio was 0.55 followed by calcination for 20 hours at 850° C. to obtain a spinel lithium manganate.

Next, the spinel lithium manganate was added to have weight percentage of 5% by weight relative to 100% by weight of the NMC composite oxide ($LiNi_{0.50}Mn_{0.30}Co_{0.20}O_2$) which was produced in the same manner as the Example 1. It was then subjected to a mechanical treatment for 1 hour by using a pulverizer. After that, it was calcined again for 10 hours at 920° C. in air atmosphere to obtain powder of Li—Ni composite oxide particles in which the spinel lithium manganate was coated in an amount of 5% by weight on the surface of secondary particles of the $LiNi_{0.50}Mn_{0.30}Co_{0.20}O_2$ as a nucleus (core). By using this Li—Ni composite oxide as a positive electrode active substance, a coin cell for evaluation was produced in the same manner as the Example 1, and then capacity molar ratio of 1/3:1/3:1/3 was produced. The metal composite hydroxide and lithium carbonate were weighed such that the molar ratio between the total mole number of metals other than Li (Ni, Co, Mn) and the mole number of Li was 1:1 and then thoroughly mixed. The temperature was increased at temperature increase rate of 5° C./min and calcination was performed at 920° C. for 10 hours in air atmosphere. After cooling to room temperature, the $LiNi_{1/3}Mn_{1/3}Co_{1/3}O_2$ was added to have weight percentage of 5% by weight relative to 100% by weight of the NMC composite oxide ($LiNi_{0.50}Mn_{0.30}Co_{0.20}O_2$) which was produced in the same manner as the Example 1. It was then subjected to a mechanical treatment for 30 minutes by using a pulverizer. After that, it was calcined again for 10 hours at 930° C. in air atmosphere to obtain powder of Li—Ni composite oxide particles in which $LiNi_{1/3}Mn_{1/3}Co_{1/3}O_2$ was coated in an amount of 5% by weight on the surface of secondary particles of the $LiNi_{0.50}Mn_{0.30}Co_{0.20}O_2$ as a nucleus (core). By using this Li—Ni composite oxide as a positive electrode active substance, a coin cell for evaluation was produced in the same manner as the Example 1, and then capacity retention rate after 200 cycles was obtained and it was evaluated as cycle durability. The results are shown in the Table 2 below. Meanwhile, the obtained coin cell was disintegrated in charged state at 4.25 V, and as a result of performing the differential scanning calorimetry (DSC) of the positive electrode, the exothermic onset temperature was found to be 295° C.

TABLE 2

| | Core-shell positive electrode material | | | Capacity | | DSC |
|---|---|---|---|---|---|---|
| | Core material | Shell material | Addition amount of shell (% by weight vs. core) | Initial discharge capacity mAh/g | retention rate after 200 cycles % | exothermic onset temperature ° C. |
| Example 1 | $LiNi_{0.5}Mn_{0.3}Co_{0.2}O_2$ | — | — | 167 | 97.1 | 292 |
| Example 8 | $LiNi_{0.5}Mn_{0.3}Co_{0.2}O_2$ | Spinel lithium manganate | 5 | 161 | 96.8 | 305 |
| Example 9 | $LiNi_{0.5}Mn_{0.3}Co_{0.2}O_2$ | $LiNi_{1/3}Mn_{1/3}Co_{1/3}O_2$ | 5 | 164 | 97.8 | 295 |

From the above results, the Example 8 and Example 9 using a core-shell type positive electrode material which is obtained by forming a shell consisting of spinel lithium manganate or $LiNi_{1/3}Mn_{1/3}Co_{1/3}O_2$ around a core consisting of the positive electrode active substance of the present invention exhibit higher capacity retention rate after 200 cycles compared to the Example 1, and thus are found to have more excellent cycle durability. Further, as the DSC exothermic onset temperature is higher than that of the Example 1, it is also found that the effect of having more excellent heat stability is exhibited.

Example 10

A mixture of the NMC composite oxide ($LiNi_{0.50}Mn_{0.30}Co_{0.20}O_2$) which was produced in the same manner as the Example 1 and the spinel lithium manganate which was produced in the same manner as the Example 8 was used as a positive electrode active substance. At that time, the mixing ratio of those materials was 90 : 10 (in terms of weight ratio of NMC composite oxide: spinel lithium manganate) . Other than those, a coin cell for evaluation was produced in the same manner as the Example 1, and then capacity retention rate after 200 cycles was obtained and it was evaluated as cycle durability. Furthermore, the obtained coin shell was charged at upper limit voltage of 4.25 V and constant current of 0.4 mA/cm$^2$ at temperature conditions of −20° C., and constant current discharge was performed until discharge end voltage of 3.0 V. After that, constant current charge was performed for the same coin cell at current conditions of 4.0 mA/cm$^2$, and constant current discharge was performed until discharge end voltage of 3.0 V. Then, the ratio between the capacity at the time of performing charge and discharge at current conditions of 0.4 mA/cm$^2$ and the capacity at the time of performing charge and discharge at current conditions of 4.0 mA/cm$^2$ was calculated and evaluated as low temperature load characteristic (−20° C. output characteristic). The results are shown in the Table 3 below.

Example 11

A coin cell for evaluation was produced in the same manner as the Example 10 except that the mixing ratio in the mixture of the NMC composite oxide ($LiNi_{0.50}Mn_{0.30}Co_{0.20}O_2$) and the spinel lithium manganate was 70:30 (in terms of weight ratio of NMC composite oxide:spinel lithium manganate), and then the capacity retention rate after 200 cycles was obtained and evaluated as cycle durability. Furthermore, the low temperature load characteristic (−20° C. output characteristic) was evaluated in the same manner as above. The results are shown in the Table 3 below.

Example 12

A coin cell for evaluation was produced in the same manner as the Example 10 except that the mixing ratio in the mixture of the NMC composite oxide ($LiNi_{0.50}Mn_{0.30}Co_{0.20}O_2$) and the spinel lithium manganate was 30:70 (in terms of weight ratio of NMC composite oxide:spinel lithium manganate), and then the capacity retention rate after 200 cycles was obtained and evaluated as cycle durability. Furthermore, the low temperature load characteristic (−20° C. output characteristic) was evaluated in the same manner as above. The results are shown in the Table 3 below.

TABLE 3

| | Mixing weight ratio of active substance (% by weight) | | Initial discharge capacity mAh/g | Capacity retention rate after 200 cycles % | −20° C. Output characteristics 4.0 mA/cm$^2$ Capacity/0.4 mA/cm$^2$ Capacity |
|---|---|---|---|---|---|
| | NMC composite oxide | Spinel lithium manganate | | | |
| Example 1 | 100 | 0 | 167 | 97.1 | 0.62 |
| Example 10 | 90 | 10 | 160 | 94.6 | 0.74 |
| Example 11 | 70 | 30 | 147 | 91.6 | 0.89 |
| Example 12 | 30 | 70 | 120 | 82.5 | 0.98 |

It is shown from the above results that, compared to the Example 1, the capacity retention rate after 200 cycles was slightly lower in the Examples 10 to 12 in which a positive electrode material formed by mixing the positive electrode active substance according to the present invention and spinel lithium manganate was used. However, the −20° C. output characteristic was improved. Based on this, it is found that the voltage lowering under high output discharge at low temperature is low so that deficient output of a vehicle is unlikely to occur even in a cold area, for example.

Example 13

95 parts by mass of alumina particles (BET specific surface area: 5 m$^2$/g, average particle diameter: 2 μm) as inorganic particles and 5 parts by mass of carboxymethyl cellulose as a binder (moisture content per binder mass: 9.12% by mass, SUNROSE (registered trademark) MAC series, manufactured by NIPPON PAPER Chemicals CO., LTD.) were homogeneously dispersed in water to prepare an aqueous solution. This aqueous solution was coated on both surfaces of a polyethylene (PE) microporous membrane (film thickness: 2 μm, porosity: 55%) by using a gravure coater. Subsequently, it was dried at 60° C. to remove water to produce a separator having a heat resistant insulating layer as a multilayer porous film with total film thickness of 25 μm, in which a heat resistant insulating layer is formed at 3.5 μm for both surfaces of a microporous membrane. The weight per unit area of a heat resistant insulating layer was 9 g/m$^2$ in a total of both surfaces.

(4) Production of Negative Electrode

Subsequently, 96.5% by weight of artificial graphite as a negative electrode active substance, 1.5% by mass of ammonium salt of carboxymethyl cellulose as a binder, and 2.0% by mass of styrene-butadiene copolymer latex were dispersed in purified water to produce a slurry of negative electrode active substance. Then, this slurry of negative electrode active substance was coated on a copper foil (thickness: 10 μm) to be a negative electrode current collector, dried for 3 minutes at 120° C., and subjected to press molding using a roll press machine to produce a negative electrode. The same treatment was performed for the back surface to form a negative electrode active substance layer so that a negative electrode having a negative electrode active substance layer formed on both surfaces of the negative electrode current collector (copper foil) was produced.

By alternately laminating, via the separator having a heat resistant insulating layer obtained from above, a positive electrode obtained by forming the positive electrode produced in the Example 1 (2) on both surfaces of a positive electrode current collector (aluminum foil) and a negative electrode produced in above (4) (positive electrode 20 layers and negative electrode 21 layers) in the same manner as above, a power generating element was produced. The obtained power generating element was disposed within a bag made of aluminum laminate sheet as an outer casing, and an electrolyte solution was added thereto. As an electrolyte solution, a solution in which 1.0 M LiPF$_6$ was dissolved in a mixture solvent of ethylene carbonate (EC) and dimethyl carbonate (DMC) (volume ratio of 1:1) was used. Subsequently, under vacuum conditions, the opening of the aluminum laminate sheet bag was sealed such that the tab for taking out current, which is connected to both electrodes, was led to outside, and a cell for test as a laminate type lithium ion secondary battery with length of 280 mm×width of 210 mm×thickness of 7 mm was completed.

For evaluation of the characteristics of a separator attached to the obtained cell for test, the cell for test was kept for 1 hour in an incubator at 150° C. and shrinkage rate of the separator was measured to evaluate the heat resistant characteristic. For the measurement of the thermal shrinkage rate, the cell for test was kept for 1 hour in an incubator at 150° C. and then taken out. Then, the length of the separator was measured, and the decrease ratio of the length compared to the length before the test was used as the thermal shrinkage rate. Furthermore, as reliability test for the cell for test which was obtained from above, the battery was kept in an incubator at 150° C. and the time until the loss of the battery function was measured and the reliability test at high temperature was carried out. The results of measuring thermal shrinkage rate and the results of the reliability test are shown in the Table 4 below. The produced battery had rated capacity of 56.6 Ah and the ratio of battery area to the rated capacity was 13.0 cm$^2$/Ah.

Example 14

A separator having a heat resistant insulating layer was obtained in the same manner as the Example 13 except that the weight per unit area of a heat resistant insulating layer was adjusted to 13 g/m$^2$ in a total of both surfaces by modifying the coating gap of the gravure coater, and the thermal shrinkage rate of the separator was measured in the same manner as above. The measurement results are shown in the Table 4 below.

Furthermore, a cell for test was produced in the same manner as the Example 13 except that the obtained separator having a heat resistant insulating layer was used, and the reliability evaluation was performed in the same manner as above. The results are shown in the Table 4 below.

Example 15

A separator having a heat resistant insulating layer was obtained in the same manner as the Example 13 except that the weight per unit area of a heat resistant insulating layer was adjusted to 15 g/m$^2$ in a total of both surfaces by modifying the coating gap of the gravure coater, and the thermal shrinkage rate of the separator was measured in the same manner as above. The measurement results are shown in the Table 4 below.

Furthermore, a cell for test was produced in the same manner as the Example 13 except that the obtained separator having a heat resistant insulating layer was used, and the reliability evaluation was performed in the same manner as above. The results are shown in the Table 4 below.

Example 16

A separator having a heat resistant insulating layer was obtained in the same manner as the Example 13 except that the weight per unit area of a heat resistant insulating layer was adjusted to 17 g/m$^2$ in a total of both surfaces by modifying the coating gap of the gravure coater, and the thermal shrinkage rate of the separator was measured in the same manner as above. The measurement results are shown in the Table 4 below.

Furthermore, a cell for test was produced in the same manner as the Example 13 except that the obtained separator having a heat resistant insulating layer was used, and the reliability evaluation was performed in the same manner as above. The results are shown in the Table 4 below.

Example 17

A separator having a heat resistant insulating layer was obtained in the same manner as Example 13 except that the weight per unit area of a heat resistant insulating layer was adjusted to 5 g/m$^2$ in a total of both surfaces by modifying the coating gap of the gravure coater, and the thermal shrinkage rate of the separator was measured in the same manner as above. The measurement results are shown in the Table 4 below.

Furthermore, a cell for test was produced in the same manner as the Example 13 except that the obtained separator having a heat resistant insulating layer was used, and the reliability evaluation was performed in the same manner as above. The results are shown in the Table 4 below.

Example 18

A separator having a heat resistant insulating layer was obtained in the same manner as the Example 13 except that the weight per unit area of a heat resistant insulating layer was adjusted to 2 g/m$^2$ in a total of both surfaces by modifying the coating gap of the gravure coater, and the thermal shrinkage rate of the separator was measured in the same manner as above. The measurement results are shown in the Table 4 below.

Furthermore, a cell for test was produced in the same manner as the Example 13 except that the obtained separator having a heat resistant insulating layer was used, and the reliability evaluation was performed in the same manner as above. The results are shown in the Table 4 below.

Example 19

The power generating element obtained from Example 13 was wound in a whirlpool shape to produce a wound electrode group. Then, the obtained wound electrode group was crushed to have a flat shape, and then put into an aluminum outer casing can with a thickness of 6 mm, a height of 50 mm, and a width of 34 mm. After injecting an electrolyte solution followed by sealing, a cell for test was produced as a lithium ion secondary battery, and the reliability test was performed in the same manner as above. The results are shown in the Table 4 below.

Example 20

With regard to the Example 19, polyethylene (PE) microporous membrane, which is a porous substrate before forming a heat resistant insulating layer on a separator having a heat resistant insulating layer, was provided by itself as a separator, and the thermal shrinkage rate was measured in the same manner as above. Furthermore, by using this separator, a cell for test was produced in the same manner as the Example 13 described above, and the reliability test was performed in the same manner as above. The results are shown in the Table 4 below.

Example 21

With regard to the Example 13, polyethylene (PE) microporous membrane, which is a porous substrate before forming a heat resistant insulating layer on a separator having a heat resistant insulating layer, was provided by itself as a separator, and the thermal shrinkage rate was measured in the same manner as above. Furthermore, by using this separator, a cell for test was produced in the same manner as the Example 13 described above, and the reliability test was performed in the same manner as above. The results are shown in the Table 4 below.

TABLE 4

| | Cell type | Weight per unit area of heat resistant insulating layer g/m$^2$ | Thermal shrinkage rate % | Evaluation of reliability Minutes (time until lowered battery voltage) |
|---|---|---|---|---|
| Example 13 | Laminate | 9 | 8 | >60 |
| Example 14 | Laminate | 13 | 7 | >60 |
| Example 15 | Laminate | 15 | 7 | >60 |
| Example 16 | Laminate | 17 | 7 | >60 |
| Example 17 | Laminate | 5 | 10 | 50 |
| Example 18 | Laminate | 2 | 15 | 35 |
| Example 19 | Can | 9 | 8 | >60 |
| Example 20 | Can | 0 | 20 | 15 |
| Example 21 | Laminate | 0 | 30 | 10 |

From the results described above, it is shown that the thermal shrinkage rate is lower in the Examples 13 to 19 in which a separator (so-called ceramic separator) having a heat resistant insulating layer (ceramic layer) on a surface is used, compared to the Example 20 and Example 21 in which no such separator is used. It is also found that the results of the reliability evaluation are improved. Furthermore, this effect exhibited by using a ceramic separator (decrease ratio of thermal shrinkage rate and improvement in reliability evaluation) is more significantly shown in a flat stack type laminate battery using a laminate film than a winding type battery in which an outer casing can is used as an outer casing body of a battery.

The present application is based on Japanese Patent Application No. 2013-040108 filed on Feb. 28, 2013, and its disclosure is entirely incorporated herein by reference.

REFERENCE SIGNS LIST

1 Shell part of positive electrode material
2 Core part of positive electrode material
3 Positive electrode material
10, 50 Lithium ion secondary battery
11 Positive electrode current collector
12 Negative electrode current collector
13 Positive electrode active substance layer
15 Negative electrode active substance layer
17 Separator
19 Single battery layer
21, 57 Power generating element
25 Positive electrode current collecting plate
27 Negative electrode current collecting plate
29, 52 Battery outer casing material
58 Positive electrode tab
59 Negative electrode tab

The invention claimed is:

1. A positive electrode active substance for a non-aqueous electrolyte secondary battery comprising a composite oxide containing lithium and nickel,
wherein the positive electrode active substance has a structure of secondary particles formed by aggregation of primary particles, the average particle diameter of primary particles (D1) is 0.9 μm or less, the average particle diameter of the primary particles (D1) and the standard deviation (σ) of the average particle diameter of the primary particles (D1) meet the relationship of $D1/\sigma^2 \geq 24$, and the tap density of the positive electrode active substance is 2.3g/cm$^3$ or more.

2. The positive electrode active substance according to claim 1, wherein the composite oxide comprises a composition represented by General Formula:
$Li_aNi_bMn_cCo_dM_xO_2$, with the proviso that, in the formula, a, b, c, d, and x satisfy $0.9 \leq a \leq 1.2$, $0<b<1$, $0<c \leq 0.5$, $0<d \leq 0.5$, $0 \leq x \leq 0.3$, and $b+c+d=1$; and M represents at least one selected from the group consisting of Ti, Zr, Nb, W, P, Al, Mg, V, Ca, Sr, and Cr.

3. The positive electrode active substance according to claim 2, wherein b, c and d are as follows: $0.44 \leq b \leq 0.51$, $0.27 \leq c \leq 0.31$, and $0.19 \leq d \leq 0.26$.

4. The positive electrode active substance according to claim 1, wherein the crystallite diameter of the positive electrode active substance is 0.4 μm or less.

5. The positive electrode active substance according to claim 1, wherein the BET specific surface area of the positive electrode active substance is 0.1 to 1.0 m$^2$/g.

6. The positive electrode active substance according to claim 1, wherein the diffraction peak of a (104) surface and the diffraction peak of a (003) surface of the positive electrode active substance obtained by powder X ray diffraction measurement have a diffraction peak intensity ratio ((003)/(104)) of 1.28 or more and a diffraction peak integrated intensity ratio ((003)/(104)) of 1.05 or more.

7. A positive electrode material for a non-aqueous electrolyte secondary battery, the positive electrode material comprising:
   a core part comprising the positive electrode active substance according to claim 1; and
   a shell part comprising a lithium-containing composite oxide which is different from the positive electrode active substance.

8. A positive electrode material for a non-aqueous electrolyte secondary battery, the positive electrode material being formed as a mixture of the positive electrode active substance according to claim 1 and a spinel type manganese positive electrode active substance.

9. The positive electrode material according to claim 8, wherein the mixing weight ratio of the positive electrode active substance and the spinel type manganese positive electrode active substance is 50:50 to 90:10.

10. A positive electrode for a non-aqueous electrolyte secondary battery, the positive electrode being obtained by forming, on a surface of a positive electrode current collector, a positive electrode active substance layer containing at least one selected from the group consisting of the positive electrode active substance according to claim 1 and a positive electrode material being formed as a mixture of the positive electrode active substance and a spinel type manganese positive electrode active substance.

11. A non-aqueous electrolyte secondary battery comprising a power generating element comprising:
   the positive electrode according to claim 10,
   a negative electrode obtained by forming a negative electrode active substance layer on a surface of a negative electrode current collector,
   and a separator.

12. The non-aqueous electrolyte secondary battery according to claim 11, wherein the separator is a separator having a heat resistant insulating layer.

13. The non-aqueous electrolyte secondary battery according to claim 11, wherein the ratio value of a battery area, projected area of a battery including an outer casing body of a battery to rated capacity is 5 $cm^2$/Ah or more and the rated capacity is 3 Ah or more.

14. The non-aqueous electrolyte secondary battery according to claim 11, wherein the aspect ratio of an electrode defined as a longitudinal/transversal ratio of a rectangular positive electrode active substance layer is 1 to 3.

* * * * *